(12) United States Patent
Moyer et al.

(10) Patent No.: US 7,383,321 B2
(45) Date of Patent: Jun. 3, 2008

(54) METHOD AND SYSTEM FOR COMMUNICATING BETWEEN A REMOTE PRINTER AND A SERVER

(76) Inventors: Alan L. Moyer, 23 Clarissa Rd., Chelmsford, MA (US) 01824; Thomas J. LeBlanc, 30 Angela St., Canton, MA (US) 02021; Leonid Winestein, 25 Baker Cir., Chestnut Hill, MA (US) 02467

( * ) Notice: Subject to any disclaimer, the term of this patent is extended or adjusted under 35 U.S.C. 154(b) by 984 days.

(21) Appl. No.: 10/191,606

(22) Filed: Jul. 9, 2002

(65) Prior Publication Data

US 2004/0010567 A1 Jan. 15, 2004

(51) Int. Cl.
*G06F 15/16* (2006.01)
(52) U.S. Cl. .................. 709/219; 709/223; 713/166; 713/172; 713/182; 358/1.1; 358/1.15; 358/1.18
(58) Field of Classification Search ............... 713/182, 713/166, 172, 200; 709/219; 380/262, 264, 380/26; 707/202
See application file for complete search history.

(56) References Cited

U.S. PATENT DOCUMENTS

| 5,787,237 | A | 7/1998 | Reilly ..................... 395/112 |
| 6,202,096 | B1 | 3/2001 | Williams .................. 709/230 |
| 6,298,164 | B1 | 10/2001 | Suzuki ..................... 382/245 |
| 6,397,261 | B1 | 5/2002 | Eldridge et al. ........... 709/299 |
| 6,526,416 | B1 * | 2/2003 | Long ....................... 707/202 |
| 6,823,457 | B1 * | 11/2004 | Berstis et al. .............. 701/1 |
| 6,831,682 | B1 * | 12/2004 | Silverbrook et al. ..... 348/207.2 |
| 6,906,810 | B2 * | 6/2005 | Senay et al. ............... 358/1.1 |
| 2002/0042884 | A1 * | 4/2002 | Wu et al. ................ 713/201 |
| 2002/0049837 | A1 * | 4/2002 | Kato ....................... 709/223 |
| 2002/0054345 | A1 * | 5/2002 | Tomida et al. ........... 358/1.15 |
| 2002/0075510 | A1 * | 6/2002 | Martinez ................ 358/1.15 |
| 2002/0078352 | A1 | 6/2002 | Angwin et al. ........... 713/169 |
| 2003/0004859 | A1 * | 1/2003 | Shaw et al. ............... 705/37 |

OTHER PUBLICATIONS

"A Painless Guide to CRC Error Detection Algorithms," Aug. 19, 1993, http://www.geocities.com/SiliconValley/Pines/8659/crc.htm, p. 1-3.*
U.S. Appl. No. 10/022,924, filed Dec. 18, 2001,"Method and Apparatus for Printing Remote Images Using a Network-Enabled Printer".
U.S. Appl. No. 10/024,068, filed Dec. 18, 2001, "Method and Apparatus for Providing Output from Remotely Located Digital Files Using a Mobile Device and Output device".
U.S. Appl. No. 10/191,161, filed Jul. 9, 2002, Method and Apparatus for Providing Output from Remotely Located Digital Files Using a Remote Printer.
U.S. Appl. No. 10/191,892, filed Jul. 9, 2002 "System for Remotely Rendering Content for Output by a Printer".

* cited by examiner

*Primary Examiner*—Yves Dalencourt
(74) *Attorney, Agent, or Firm*—Woodcock Washburn LLP

(57) ABSTRACT

In order to enable downloading to a mobile printer data items from a server, a method is disclosed comprising the steps of establishing communication connection end points ("sockets"), communicating with the server, where the communication includes sending a request for authentication to the server, receiving an authentication response, requesting print data portions from the server, receiving the requested print data portions, and notifying the server after each print data portion has been printed. The method also includes the step of terminating their communication connection when a printing session ends or if an error occurs. The method constitutes a printer-server protocol.

55 Claims, 12 Drawing Sheets

US 7,383,321 B2

METHOD AND SYSTEM FOR COMMUNICATING BETWEEN A REMOTE PRINTER AND A SERVER

CROSS REFERENCE TO RELATED APPLICATIONS

This application is related to the following commonly-owned patent applications, each of which is hereby incorporated by reference in its entirety:

Ser. No. 09/870,538, filed May 30, 2001, entitled "Method and System for Generating a Permanent Record of a Service Provided to a Mobile Device";

Ser. No. 10/022,924, filed Dec. 18, 2001, entitled "Method and Apparatus for Printing Remote Images Using a Network-Enabled Printer", now U.S. Pat. No. 6,976,084 B2;

Ser. No. 10/024,068, filed Dec. 18, 2001, entitled "Method and Apparatus for Providing Output from Remotely Located Digital Files Using a Mobile Device and Output Device", now abandoned and replaced by continuation application Ser. No. 11/150,948, filed Jun. 13, 2005;

Ser. No. 10/191,161, concurrently filed herewith, entitled "Method and Apparatus for Providing Output from Remotely Located Digital Files Using a Remote Printer"; and Ser. No. 10/191,892, concurrently filed herewith, entitled "System for Remotely Rendering Content for Output by a Printer".

FIELD OF THE INVENTION

The present invention relates to techniques for printing digital images and, more particularly, to techniques for communicating between a remote printer having communication capabilities and a server.

RELATED ART

The Internet, and in particular the World Wide Web (the "Web"), is increasingly being used to store and exchange information and to perform commercial transactions. Although the Web was originally only capable of storing and displaying textual information, the Web may now be used to store, display, and exchange a wide variety of textual, graphical, and audiovisual information such as digital images and full-motion video.

Digital photography, for example, is becoming increasingly popular, spurred in large part by the advent of low-cost, high-quality digital cameras. An increasing number of web sites allow users to upload digital photographs and other digital images to the Web, whereby such images may subsequently be viewed, shared, edited, and printed on conventional printers using computers connected to the Web using conventional Internet connections.

To print a digital image from the Web, a user must typically use a conventional desktop or laptop computer to establish a Web connection using a conventional modem or other network connection device. The user must then locate the digital image (such as a digital photograph) to be printed or complete a transaction that produces an image (such as a ticket) to be printed. The user must then typically download the located image from the Web site to the computer. To print the image, the user must typically issue a "print" command to the Web browser or other software executing on the computer.

Such a process can be cumbersome for the user and may restrict the range of circumstances in which the user may print digital images from the Web. For example, the conventional method described above involves several discrete steps, each of which must be initiated by the user: locating the desired image, downloading the image to a host computer, and issuing a print command to print the image.

Locating the desired image may be difficult if the user does not know or remember the precise Web address of the image to be printed. Even if the user does remember, for example the address of the home page of the Web site on which the image is stored, it may be necessary for the user to perform several steps to navigate a Web browser to the precise image to be downloaded.

If the image to be printed cannot be printed directly from the Web page on which it is stored, it may be necessary for the user to download the image to the host computer. This may require the user to perform several steps, such as selecting the image, providing a filename for the image, and selecting a location on a local storage device (such as a hard disk drive) on which the image is to be stored.

Printing the image may also be problematic. For example, if the image has been downloaded to a local storage device, the user may have to locate the image on the storage device and open the image file using imaging software before issuing a print command. The print command may fail for a variety of reasons, such as a faulty connection between the host computer and the printer or the absence of an appropriate printer driver on the host computer. After printing the image, the user typically must manually delete the downloaded image file from the local storage device.

In particular, it may be difficult and/or time consuming for a user to print images that are generated as a result of a non-Web transaction. Consider, for example, a user who purchases a ticket (such as a concert ticket or airline ticket) over the telephone. If such a transaction generates a ticket that is accessible over the Web for printing, the conventional system described above would require the user to connect the host computer to the Web, locate the image of the ticket using a Web browser, and print the image. Such a process requires the user to engage in a significant amount of post-transaction activity and may be particularly difficult for those users who have chosen to conduct the transaction (e.g., purchase the ticket) over the telephone because they are not familiar with using computers in general or the Web in particular. Users who are unable to print the resulting ticket may become dissatisfied with the associated service and fail to become repeat customers.

It should therefore be apparent that the process of printing images from the Web using a conventional computer connected to a conventional printer can be a tedious, time-consuming, and error-prone process.

Furthermore, the requirement that the printer be connected to a host computer has a variety of disadvantages. For example, a mobile computer user who desires the ability to print images from a variety of locations (such as at home and at the office) must have access to a Web-connected computer in each such location. Using the techniques described above, even a small mobile printer must be connected to a computer to print images from the Web. As a result, a user who wishes to print such remote images may be required to travel with both a printer and a laptop computer, or may be limited to printing images from locations at which a Web-connected desktop computer is available. The requirement that the printer be connected to a computer therefore limits the mobility of the user and limits the range of locations from which images may be remotely printed.

What is needed, therefore, are improved techniques for downloading and printing digital images.

In concurrently filed application Ser. No. 10/191,161, entitled "Method and Apparatus for Providing Output from Remotely Located Digital Files Using a Remote Printer techniques are disclosed for coupling a printer to a communications network (such as a Plain Old Telephone Service network or wireless voice or data networks), downloading printing information (such as a digital image) to the printer over the communications network, and using the printer to print output based on the printing information. The printer includes a network communications device, such as a modem, that enables the printer to connect directly to the communications network. The printing information may be downloaded to the printer in any of a variety of ways. For example, the printer may establish a connection to a printing server that serves the printing information. A connection between the printer and the printing server may be established, for example, by using the printer to place a telephone call to the printing server over a Plain Old Telephone Service (POTS) network. The printer may then download the printing information over the POTS network and print the image specified by the printing information.

Data communications over telephone and wireless connections can be unreliable. There is a need for a protocol for communicating between the printer and the printing server that ensures reliable communication and allows the transmission of information that restart at the point of interruption if interrupted.

It is an object of this invention to provide one embodiment of a protocol for communicating between the printer and the printing server that ensures reliable communication.

It is a further object of this invention to provide a protocol that allows the printing of documents with multiple pages and provides error checking.

It is also an object of this invention to provide a protocol that enables the communicating of the state of previous prints between the printer and the server and to provide secure access to this information.

SUMMARY OF THE INVENTION

The objects set forth above as well as further and other objects and advantages of the present invention are achieved by the embodiments of the invention described hereinbelow.

In order to enable downloading to a mobile printer data items from a server, a method comprising the steps of establishing communication connection end points ("sockets"), communicating with the server, where the communication includes sending a request for authentication to the server, receiving an authentication response, requesting print data portions from the server, receiving the requested print data portions, and notifying the server after each print data portion has been validated and printed is disclosed. The method also includes the step of terminating their communication connection when a printing session ends or if the time between commands received from the printer exceeds a constant timeout period or if an error occurs. In the authentication process, the server receives the characteristics of the mobile printer and the characteristics are compared to a database at the server thereby enabling the server to identify printing preferences. Knowledge of the printer characteristics and the printing preferences enables the preparing of documents to be printed at a specific mobile printer and the processing the documents to achieve optimum quality prints. If the printer is not registered (not found in the database), the remote printer will be registered automatically during authentication. In addition, as part of the authentication process, the printer transmits information to the server that allows the determining of print completion failures. Following this determination of print completion failures, the server can provide the mobile printer with the previously attempted print data and the printer can re-attempt printing. In the process of requesting print data portions from the server, the printer can request a partial print data portion. Requesting and receiving partial print data portions, renders the printer-server connection robust against noisy transmission and transmission interruption. Robustness against transmission errors is further enhanced by the use of security indicators. A security indicator is calculated at the server for each data portion and communicated to the remote printer along with the data portion. At the printer, the security indicator is calculated again and compared to the one received from the server. The security indicator can be a cyclic redundancy code (CRC), a digital signature such as that calculated by means of the MD5 message digest algorithm or just a known number (a so called Magic number) or a combination of the these. (A Magic number is a known, fixed number that is used to verify that the data stream is synchronized at the send/receive ends and that the data to follow is as expected.)

The above-described method constitutes a printer-server protocol and is implemented in a computer readable code. The computer readable code is embodied in a computer usable memory. Both the server and the printer include computer usable memories in which the computer readable code that implements the protocol is embodied.

The use of the printer server protocol of this invention obviates the need for a printer driver and enables the operation of the printer without a companion computer. Thus, the remote printer with communication capabilities can be connected to a network, and connected through the network to the server. The printer can be used anywhere, can be connected to a wireless phone or to a telephone network (POTS network) and data downloaded and printed.

To enable the remote operation of the printer (without a companion computer), complete two-way communication between the printer and the server is needed. The invention disclosed herein enables complete two-way communication between output devices and servers and supports the ability to continue transmission of data if the transmission was previously interrupted.

Although the printer is described herein as a device for printing images, it should be appreciated that more generally the term "printer" is used herein to refer to any device for receiving input and producing hard or soft copy output. Such input/output may include not only static images but also an audiovisual stream (which may include an audio stream, a video stream, or any combination thereof). It should therefore be appreciated that the term "image" (when referring, for example, to stored images and a printed image) may refer not only to a static image, but to any of the kinds of information that the printer may receive and output. The printer may, for example, be a CD drive (such as a CD-ROM, CD-R, or CD-RW drive), DVD player, or MP3 player that includes a network communications device and performs the other functions of the printer that are described herein.

For a better understanding of the present invention, together with other and further objects thereof, reference is made to the accompanying drawings and detailed description and its scope will be pointed out in the appended claims.

DETAILED DESCRIPTION

Figure 1:
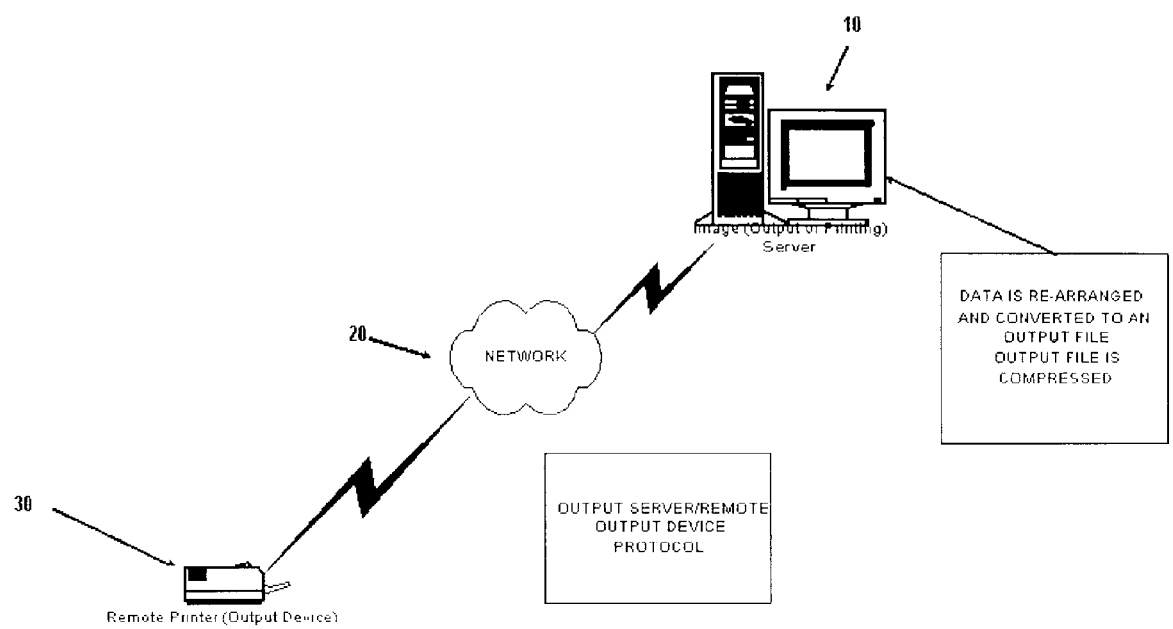
FIG. 1 is a graphical representation of a printer-server system embodying this invention.

Data received at server 10, as shown in FIG. 1, is provided to remote printer 30 via a network 20. Such a system is disclosed in the above referenced U.S. patent application Ser. No. 10/191,161, entitled "Method and Apparatus for Providing Output from Remotely Located Digital Files Using a Remote Printer". Once received at the output (or printing) server 10, the data is processed, rearranged and converted into a form suitable for output. One embodiment of method of rearranging and converting the data in the data structure and into a form suitable for printing (output) is described in the above-referenced U.S. patent application Ser. No. 10/191,892. The processed, rearranged and converted information is then provided to the mobile printer 30 (output device, herein after also referred to as "printer") over the network 20 (where the network can be a POTS network or a wireless voice or data network). An embodiment of a protocol for communicating between printer 30 and server 10 is disclosed herein.

Figure 2:
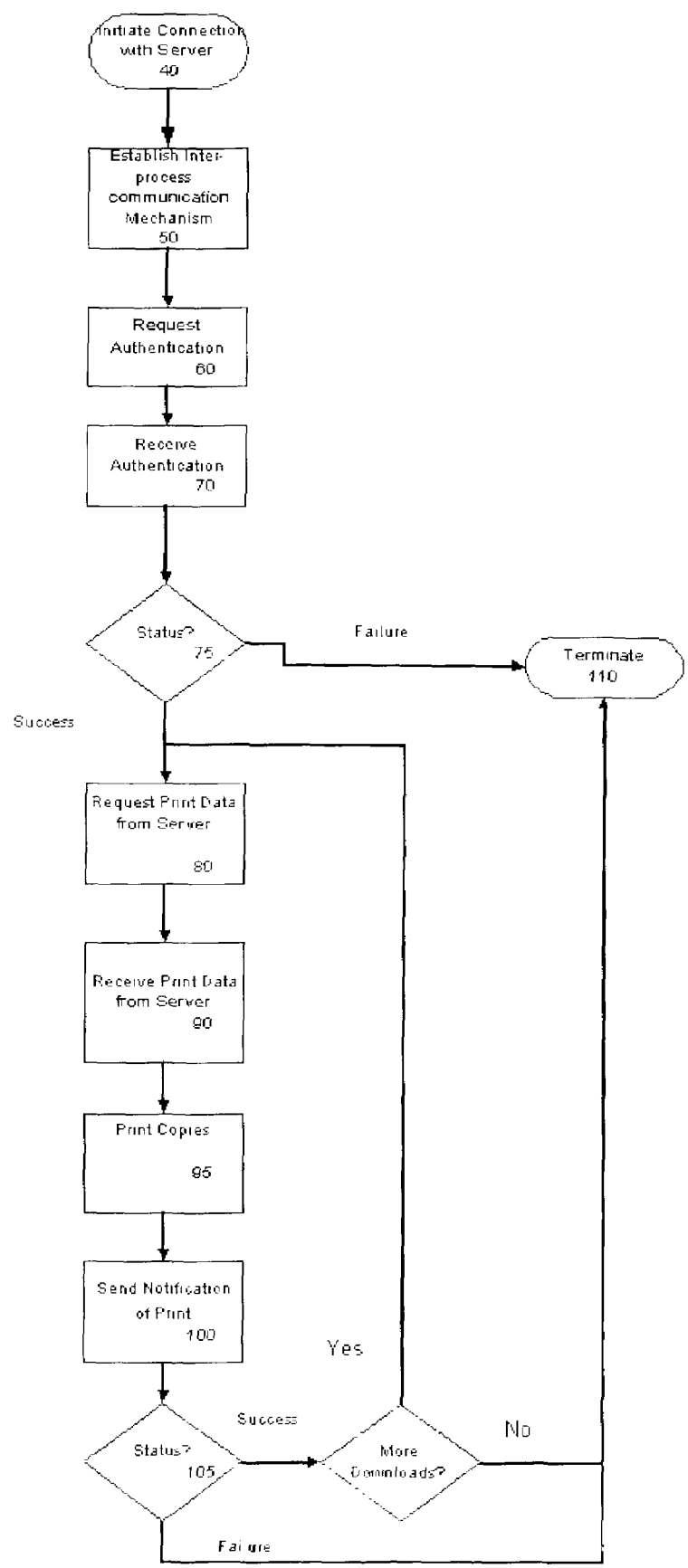
FIG. 2 is a flowchart of an embodiment of the method of this invention as applied at the remote printer.

A method that enables downloading, to the printer 30, data items from the server 10 is shown in FIG. 2. The printer 30 initiates a connection to the server 10 over the network 20 (step 40, FIG. 2). The connection can be initiated via a telephone call or by other means to access a system via a network such as those used in computer networks. The printer 30 then establishes an interprocess communication mechanism at one end of the interprocess communication channel (for example, "a socket") comprising a connection end point and a network address, the network address identifying the server 10 in the network 20 (step 50, FIG. 2). "Sockets" are the most common mechanism and method for two programs at different locations in a network to communicate. "Sockets" are supported in most operating systems, such as UNIX, Windows, MS-DOS, MacOS. (In non-technical terms, sockets are akin to telephone connections to allow one program or process to communicate with another.) "Sockets" are established and used with a set of functions termed the sockets application programming interface (API) which is provided by the operating system. A typical socket API has the following major functions: a function for creating a socket; a bind function for binding a socket to an end point of a known protocol/port; a listen function for placing a socket bound to a known port in a passive mode; an accept function for accepting incoming connections from a passive socket; a connect function for opening active connections to remote endpoints; a read function for reading data from existing connections; a write function for writing data to existing connections; and a function for closing existing connections. After the interprocess communication mechanism ("socket") is established, the printer 30 then communicates with the server 10. The communication between printer 30 and server 10 comprises authentication (steps 60 and 70, FIG. 2) and the request (step 80, FIG. 2) and receipt (step 90, FIG. 2) of print data. After printing the print data, the printer 30 sends a print notification to the server 10 (step 100, FIG. 2). Upon completion of the printing session or if an error occurs in transmission, the communication session terminates (step 110, FIG. 2) by closing the socket and disconnecting the network connection.

Figure 3:
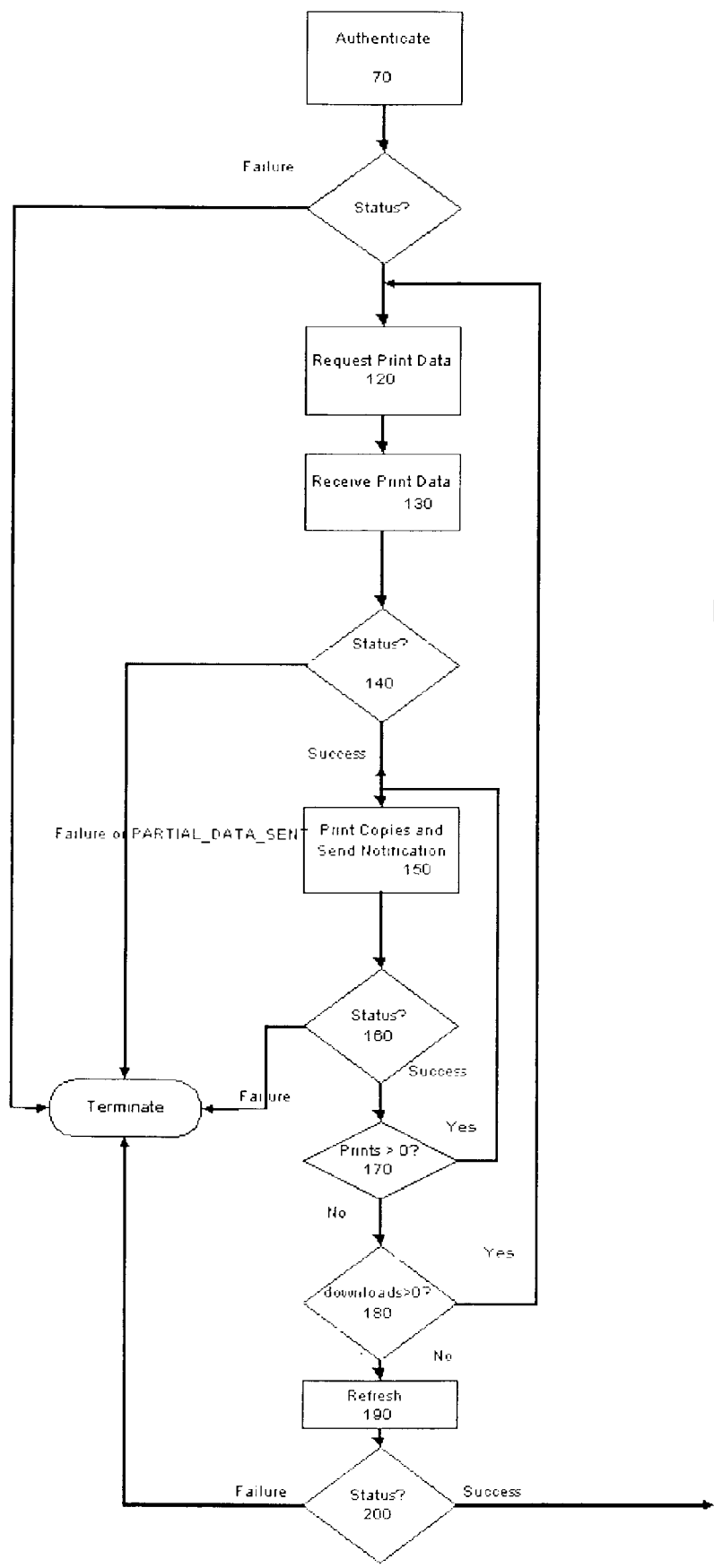
FIG. 3 is a flowchart of an embodiment of the method of this invention at the remote printer depicting a more detailed representation of method for receiving subsequent print data portions.

It should be apparent that a printing session can involve printing multiple documents. FIG. 3 provides a more detailed description of the steps of requesting from the server 10 print data portions and in receiving from the server 10 print data portions. Following a request for authentication (step 60, FIG. 2), the server 10 provides a response (step 70, FIG. 2) including status information, a specified number for the data items to be printed, and a specified number for the print data portions to be downloaded. The printer 30 then: (a) requests from the server 10 one print data portion (step 120, FIG. 3); (b) receives a response from the server 10 including the one print data portion, a specified number of copies to be printed of that one print data portion, and a transmission status for the data portion request (step 130, FIG. 3); (c) terminates the communications connection if the transmission status indicates a transmission failure (step 140, FIG. 3); (d) prints the one print data portion, if the transmission status indicates a transmission success (step 150, FIG. 3); (e) sends a notification of print completion to the server upon completion of printing (step 150, FIG. 3); and, (f) terminates the communications connection if print completion was not successful (step 160, FIG. 3). In order to print a specified number of copies of one print data portion, in step (g) steps (d) through (f) are repeated until the specified number of copies to be printed of that one print data portion are printed, unless print completion is not successful for any copy (step 170, FIG. 3). In order to download the specified number of print data portions to be downloaded, steps (a) through (g) are repeated until the specified number of print data portions to be down loaded has been downloaded (step 180, FIG. 3).

For simplicity, FIG. 3 indicates that all the copies of the last downloaded print data portion are to be printed before attempting to download a new print data portion. However, this not required. If the printer has sufficient CPU and memory resources, it can begin downloading the next print data portion while it is printing the current one. It is only necessary to send notification of print completion for each actual hard copy print made as soon as possible and keep track of additional variables that differentiate between the print data portion already downloaded and the print data portion in process of being downloaded. In this case, sending notification of print completion must be delayed until the next print data portion has been received since the printer API cannot return from sending a notification of print completion until it receives a response from the server and the next print data portion will still be in the input socket stream until that call completes.

Figure 4:
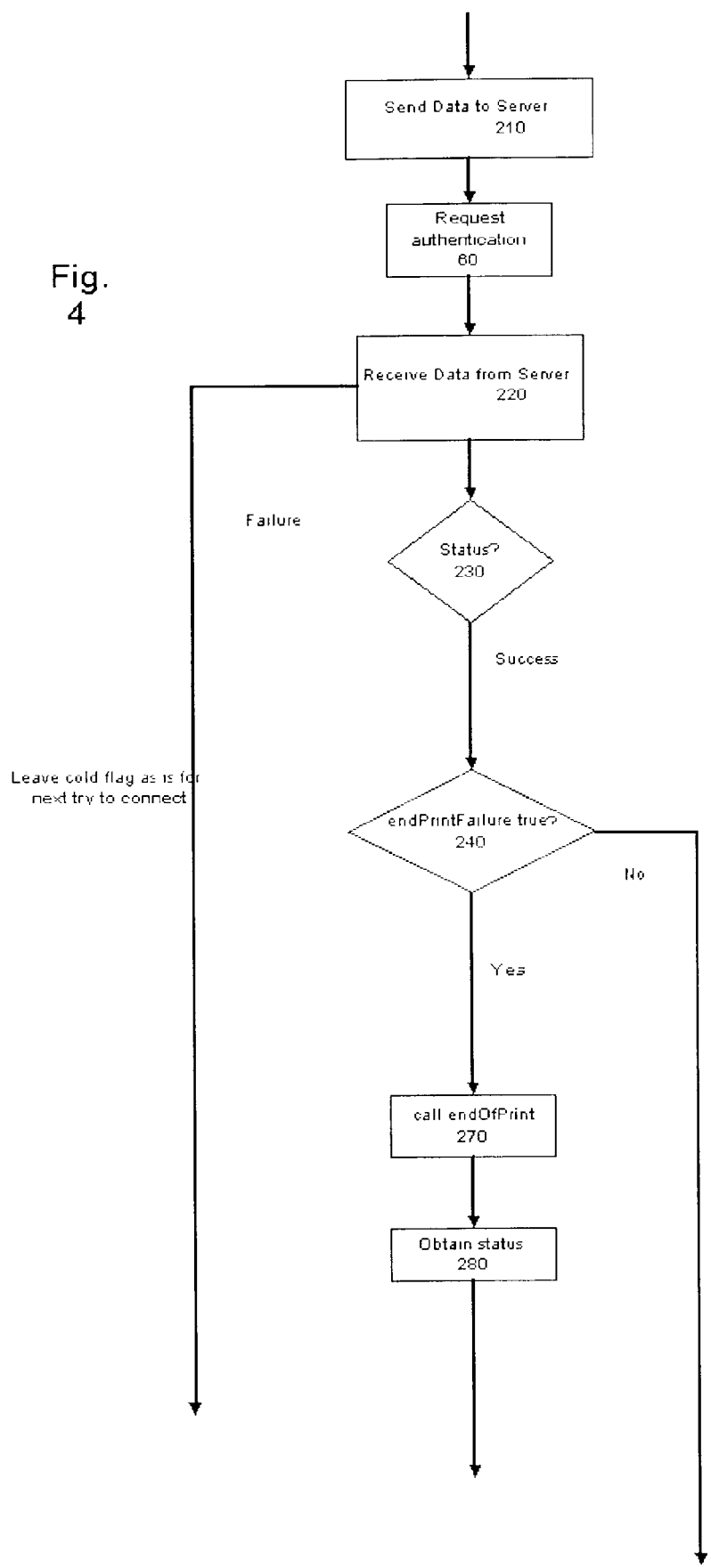
FIG. 4 is a flowchart of an embodiment of the method of this invention at the remote printer depicting a more detailed representation of method for receiving from the server an authentication response.

Authentication (steps 60 and 70, FIG. 2) is described in more detail in FIG. 4. When the printer 30 send a request for authentication to the server 10 (steps 60, FIG. 2), the printer 30 also sends to the server 10 data identifying the characteristics of the printer (step 210, FIG. 4). When the printer 30 receives the response from the server (step 70, FIG. 2), the printer 30 receives, from the server, status information, a specified number for the data items to be printed and, a specified number for the print data portions to be downloaded (step 220, FIG. 4). The status information is examined (step 230, FIG. 4) to determine success or failure of authentication. If the printer determines that a failure ocurred, the connection is terminated (step 110, FIG. 2). If status indicates a success, the printer 30 determines if the previous communication connection resulted in a notification of print completion indicating a print completion failure (step 240, FIG. 4). If the previous communication connection resulted in a notification of print completion failure, the printer 30 attempts to notify the server 10 by performing the following steps:

the printer 30 sends a notification of print completion to the server (step 280, FIG. 4); and, it receives from the server status information (step 280, FIG. 4).

Figure 5:
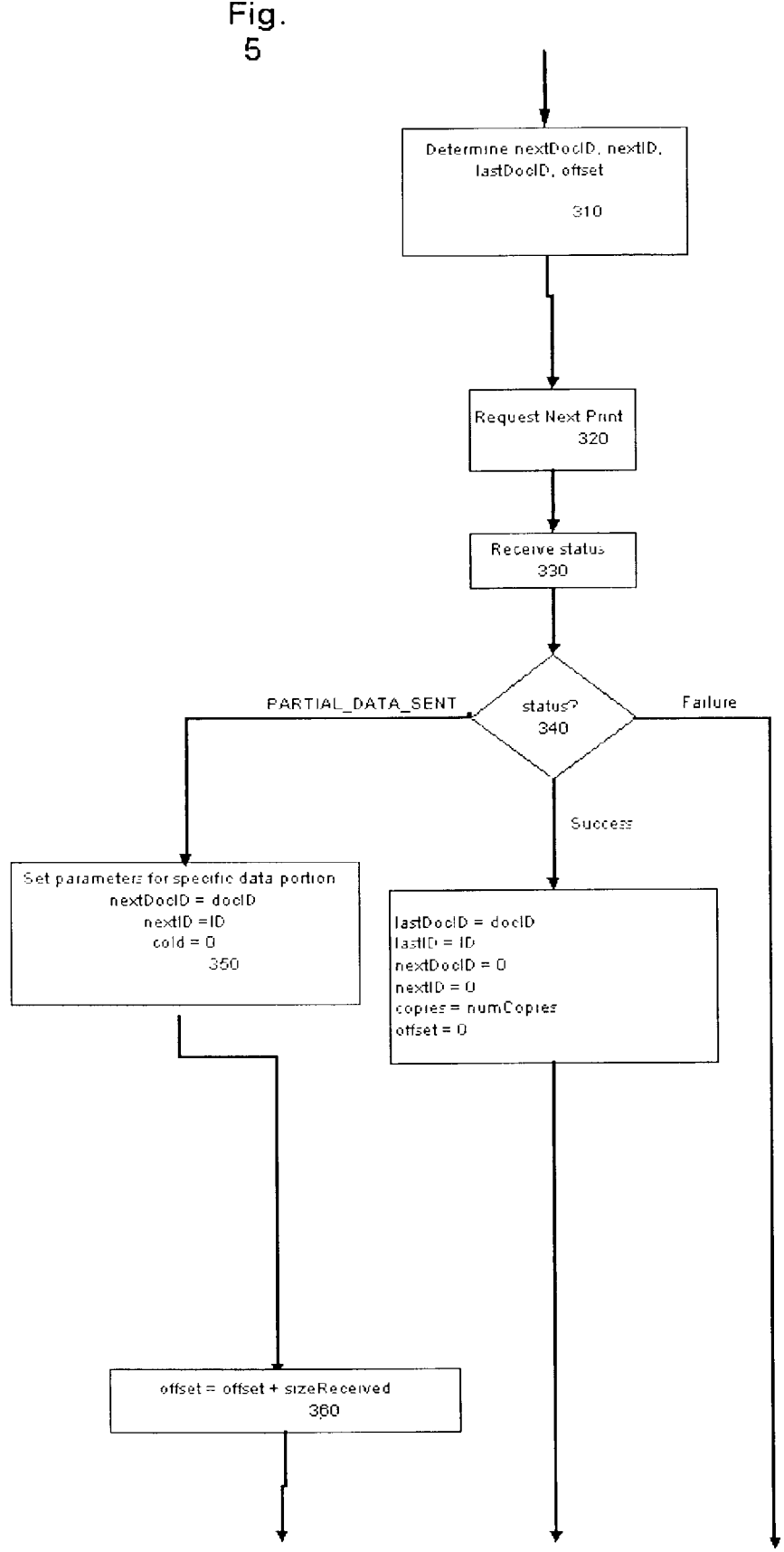
FIG. 5 is a flowchart of an embodiment of the method of this invention at the remote printer depicting a more detailed representation of method for receiving print data portions from the server.

Requesting (step 80, FIG. 2) and receiving (step 90, FIG. 2) print data is described in more detail in FIG. 5. The printer 30 determines identifying data for the next document to be printed and the last document printed, identifying data for the print data portion in the next document to be printed and identifying data for an offset. (The offset allows the re-start of transmission that has been interrupted. If the document and the data portion that were being transmitted when the interruption occurred can be identified and the location in the file at which the transmission was interrupted is known, the offset indicates the location in the file at which transmission should resume.) In reply to the print data portion (step 310, FIG. 5), the printer 30 then requests print data from the server 10 (step 320, FIG. 5) and receives from the server 10 a transmission status (step 330, FIG. 5), as well as identifying data for a document and identifying data for a print data portion in that document. These identifying data are generated at the server. Content to print is queued up on the server 10 in a database. The user of the printer 30 can set preferences as what content is to be printed first such as "print oldest first", "print newest first", "print tickets first". This method enables printing a multiple page document. Multipage documents will have one print data portion per page. On the server, they will be grouped together in a single document database table record. Each document will consist of one or more document items. On the server, a document item record will hold the print data portion for the page.

If the printer determines there was a failure, the connection is terminated (step 110, FIG. 2). If a saved status from a previous communication indicates a partial data sent status, the printer 30 receives the remaining part of a partially downloaded data portion by receiving from the server a specific print data portion having a given size (step 350, FIG. 5), and increasing the offset by the given size of the specific print data portion (step 360, FIG. 5).

The print data portions downloaded from the server 10 can be compressed data or not compressed data. If they are compressed as downloaded, the print data portions must be uncompressed at the printer 30 before printing. Compression schemes used can be lossless such as arithmetic coding, Huffman coding or other forms of entropy coding, or lossy, such as transform coding (DCT, wavelet, for example). Compression schemes used can be standard, such as JPEG, or can be tailored to the application.

Figure 6:
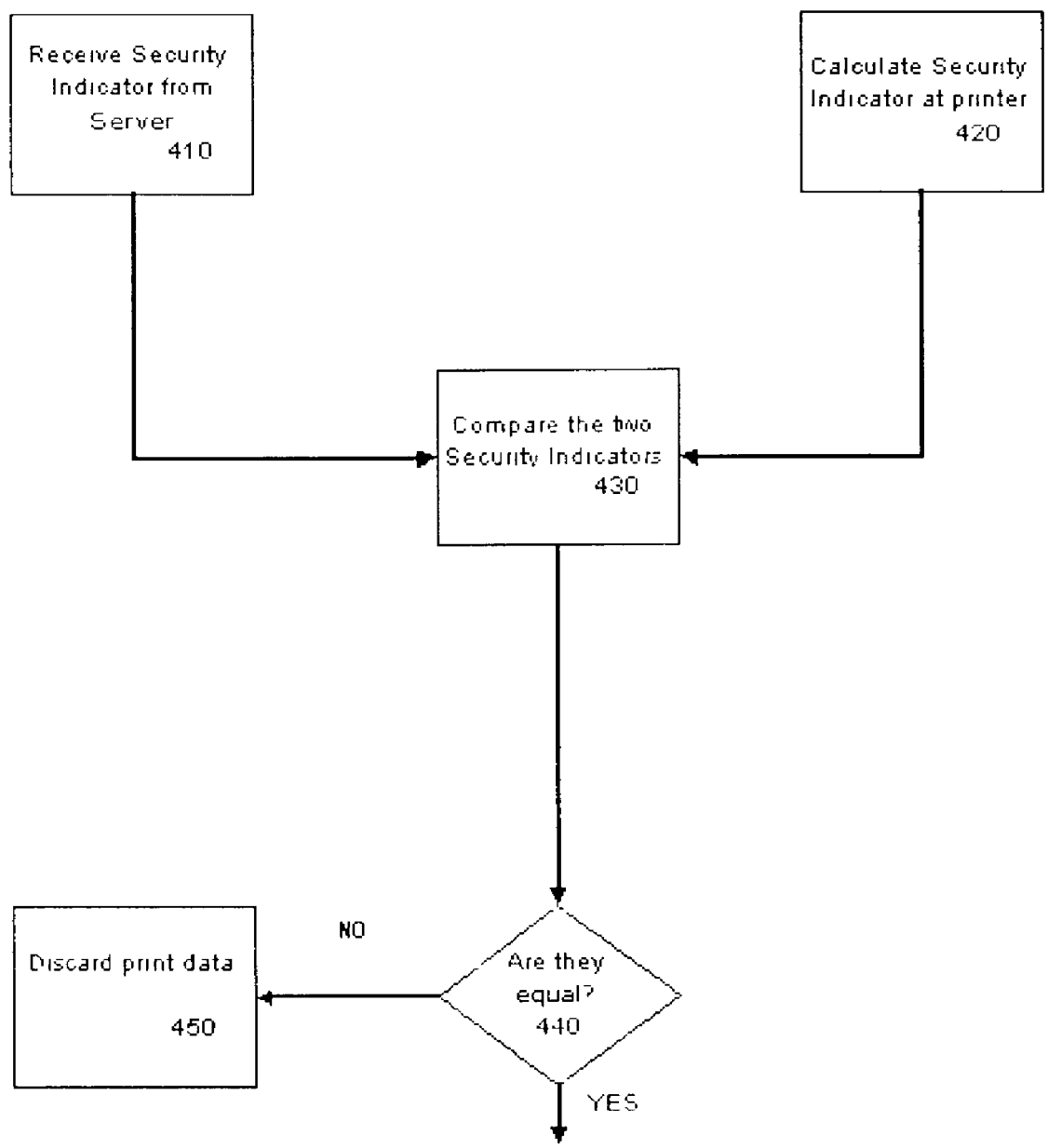
FIG. 6 is a flowchart of an embodiment of the method of this invention at the remote printer depicting a more detailed representation of method for utilizing a security indicator.

Additional verification of correct transmission is obtained by means of security indicators that are transmitted along with the data. Referring to FIG. 6, a security indicator is received from the server 10 for each of said print data portions, where each of the security indicators is calculated from each of the print data portions (step 410, FIG. 6). At the printer 30 a printer calculated security indicator is calculated for each of the print data portions (step 420, FIG. 6). For each print data portion, the printer calculated security indicator is compared with the security indicator provided by the server 10 (step 430, FIG. 6). If the comparison of security indicators yields a difference, a status is generated indicating a transmission failure for the corresponding print data portion (step 440, FIG. 6). The security indicator can be a cyclic redundancy code (CRC), a digital signature such as that calculated by means of the MD5 message digest algorithm or as a simple number known to both printer 30 and server 10 (MAGIC numbers), or a combination of the two. (The MAGIC numbers can also be used to verify that the printer and the server are synchronized.)

When a CRC or a digital signature such as that calculated by means of the MD5 message digest algorithm is used as a security indicator, and the response from the server 10 initiates the transfer of a new print data portion to the printer 30, if the header data returned is error-free, then the CRC value or a digital signature such as that calculated by means of the MD5 message digest algorithm returned from the server 10 should be saved. (As used hereinafter, CRC refers to CRC or a digital signature such as that calculated by means of the MD5 message digest algorithm.) This value represents the CRC of the entire print data portion. If errors then occur in transmission of the print data portion so that only partial data is received, this CRC is to be saved until the entire print data portion has been sent to the printer 30. This may require more than one call to the server 10. After the entire print data portion is received, the CRC value of the print data portion should be computed at the printer and compared to the saved CRC. If they differ, the print data portion must be discarded and the process repeated from the beginning. If the print data portion is being requested with offset greater than zero, then the CRC returned from the server only corresponds to the portion of the print data portion from the offset to the end of the print data portion.

Figure 7:
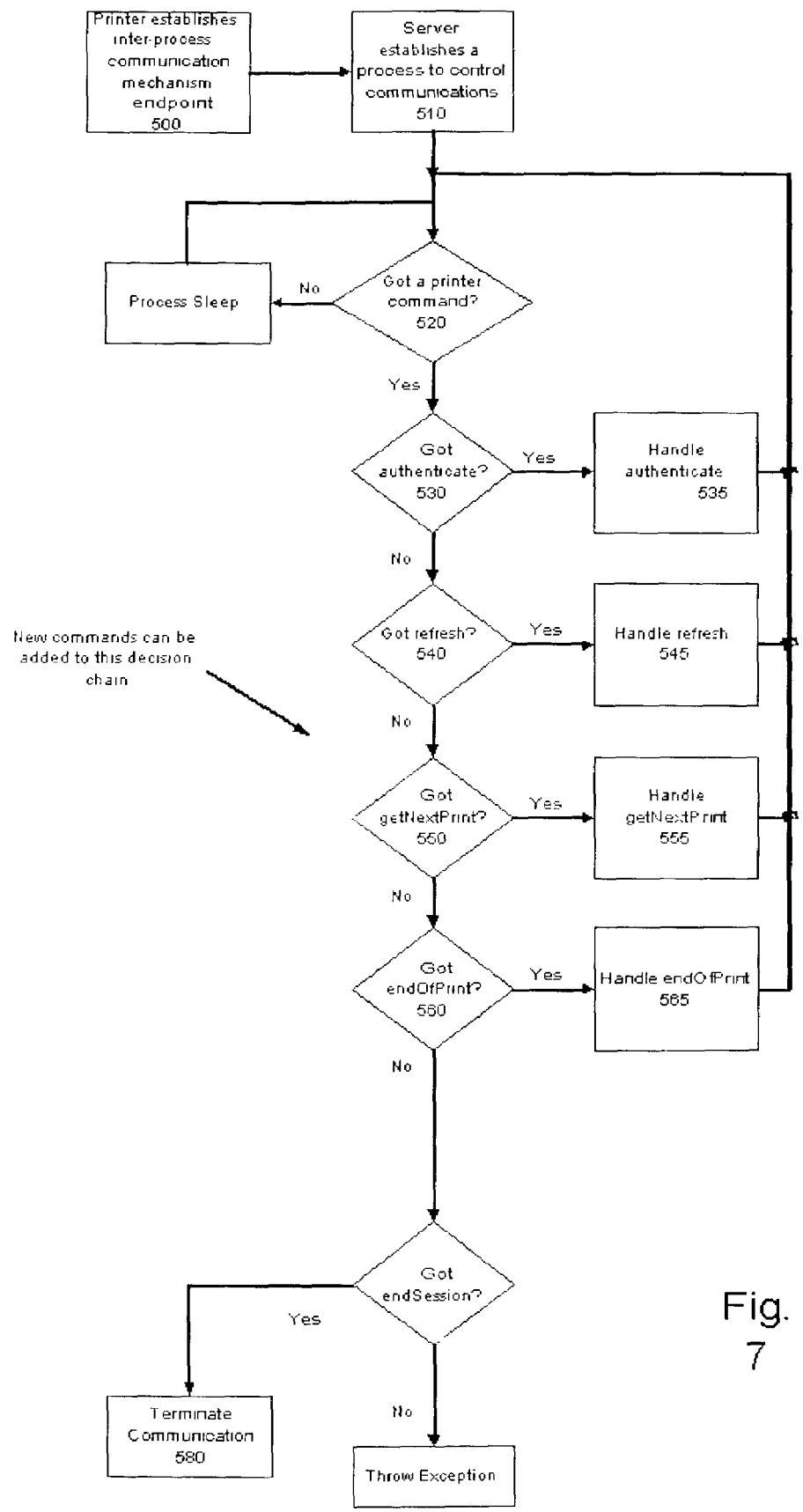
FIG. 7 is a flowchart of an embodiment of the method of this invention as applied at the server.

A method for enabling the server 10 to provide data items to the printer 30 is shown in FIG. 7. A process to control communications through a communication connection endpoint to another communication connection endpoint is established at the server 10 (step 510, FIG. 7), upon the other communication connection endpoint being established at the printer 30 (step 500, FIG. 7). In an embodiment using "sockets", a "socket" to the server 10 is opened at the printer 30. The server 10 starts a process to control communications (a "socket" handler). After a unique process to control communications has been established, the server 10 responds to requests from each connected printer 30 (step 520, FIG. 7). Upon receipt of an authentication request from the printer 30 (step 530, FIG. 7), the server 10 sends an authentication response, status information, a specified number for the data items to be printed and, a specified number for the print data portions to be downloaded to the printer 30 (step 535, FIG. 7). Upon receipt of a request from the printer 30 for an update on the specified numbers for the data items and the print data portions (step 540, FIG. 7), the server 10 sends to the printer 30 an updated specified number of data items to be printed and an updated specified number of print data portions to be downloaded (step 545, FIG. 7). Upon receipt of a request from the printer 30 for print data portions to be downloaded (step 550, FIG. 7), the server 10 sends print data portions to be printed (step 555, FIG. 7). The server 10 receives from the printer 30 notification after each print data portion has been printed (step 560, FIG. 7). The server 10 sends status information to the printer 30 in response to receipt of notification after printing (step 565, FIG. 7). The server 10 terminates the communications connection when a printing session ends or even if an error occurs (step 580, FIG. 7).

Figure 8:
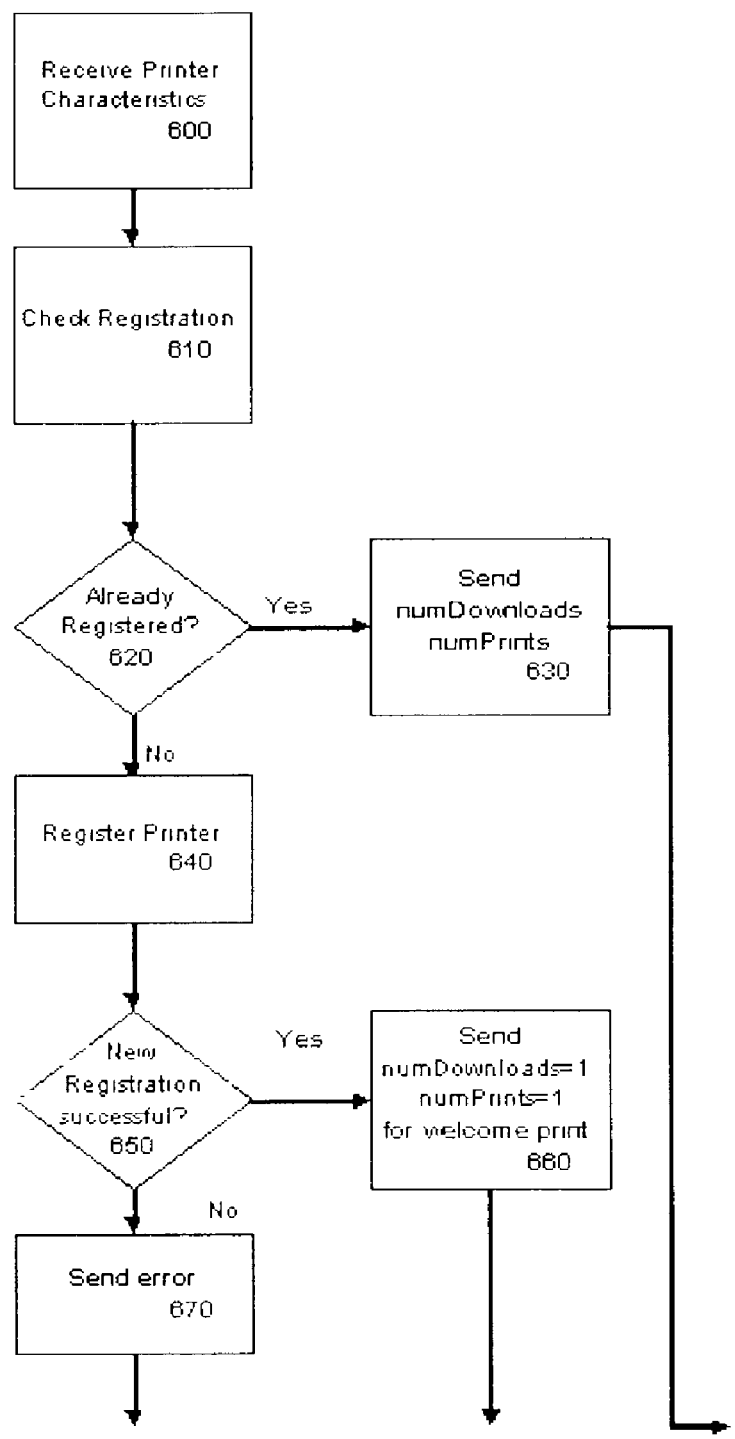
FIG. 8 is a flowchart of an embodiment of the method of this invention as applied at the server depicting a more detailed representation of method for sending to the remote printer an authentication; and, FIG. 9 is a flowchart of an embodiment of the method of this invention s applied at the server depicting a more detailed representation of method for sending print data portions to the remote printer.

The authentication process at the server 10 (step 535, FIG. 7), in response to an authentication request received from the printer 30 (step 530, FIG. 7) is described in more detail in FIG. 8. The server 10 receives from the printer 30 data identifying the characteristics of the printer (step 600, FIG. 8). The data identifying the characteristics of the printer includes the serial number, the model number and the firmware number (revision, model) of the printer 30. The characteristics of the printer are compared to data in a database in order to verify registration (step 610, FIG. 8). If the characteristics of the printer 30 are found in the database, a specified number for the data items to be printed, and a specified number for the print data portions to be downloaded are sent to the printer 30 (step 630, FIG. 8). If the characteristics of the mobile printer are not found in the database, the printer 30 is registered by performing a registration process comprising the steps of:

registering the characteristics of the mobile printer in the database (step 640, FIG. 8), determining if the registration was successful (step 650, FIG. 8), sending to the mobile printer a specified number for the data items to be printed, and a specified number for the print data portions to be downloaded, if the registration was successful (step 660, FIG. 8), sending to the mobile printer an error status, if the registration was not successful (step 670, FIG. 8).

Figure 9:
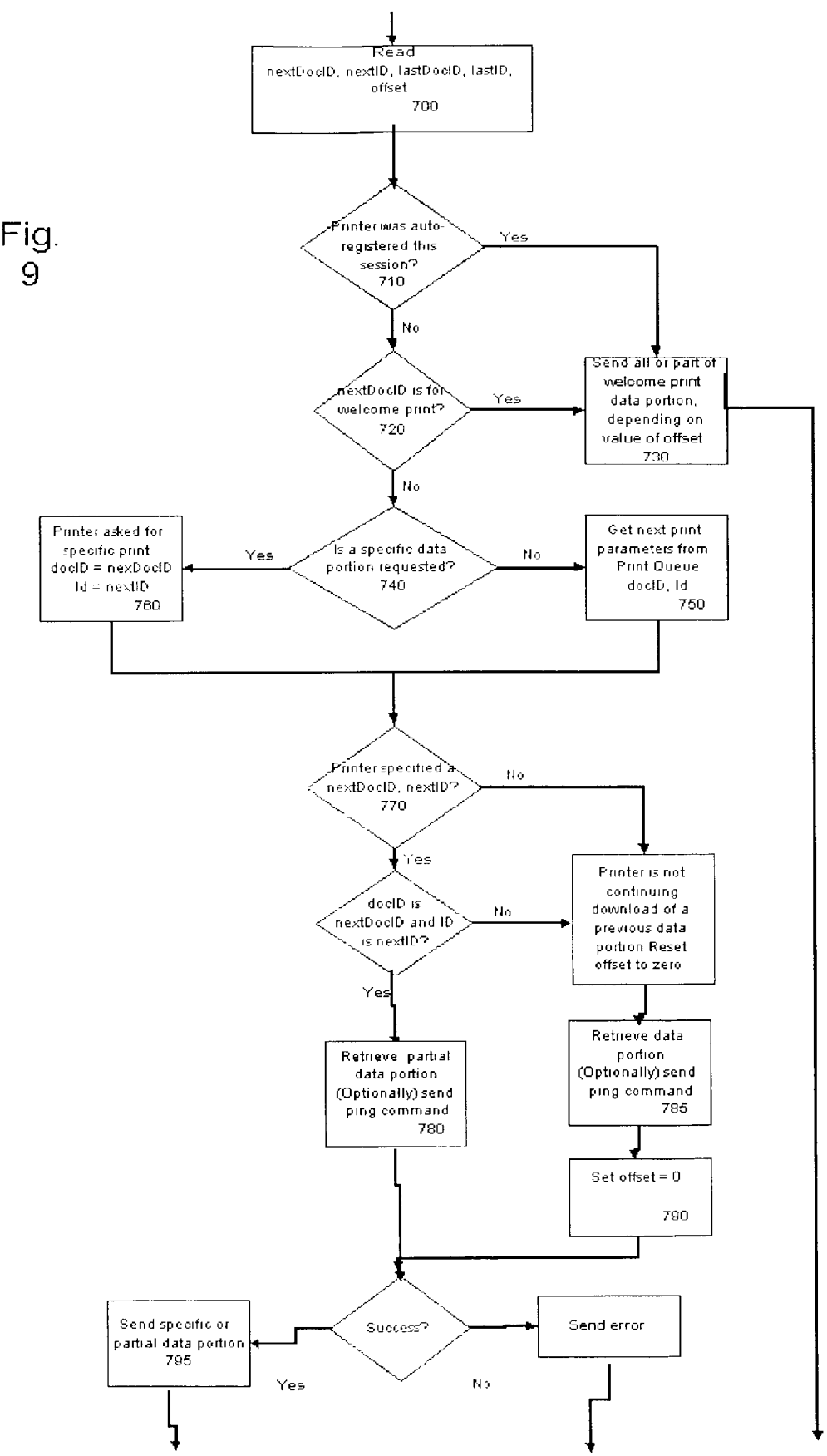

The response to a request from the printer 30 for print data portions to be downloaded (step 550, FIG. 7) is shown in more detail in FIG. 9. The server 10 receives identifying data for a next document to be printed, identifying data for a next print data portion to be printed, identifying data for a last document which was printed, and identifying data for a last print data portion which was printed (step 700, FIG. 9). Then, the server 10 determines if a request for print data portions is immediately subsequent to a mobile printer registration (step 710, FIG. 9). If the request for print data portions is immediately subsequent to a printer registration (step 710, FIG. 9), the server 10 sends to the printer 30 one or more welcome print data portions (step 730, FIG. 9). If the next document to be printed is a welcome print document (step 720, FIG. 9), the server 10 sends to the printer 30 one or more welcome print data portions (step 730, FIG. 9). The server 10, then, determines if a specific data portion is requested by the printer (step 740, FIG. 9). If a specific data portion was not requested by the printer 30, the server 10 sends a next data portion in a print queue (step 750, FIG. 9). If a specific data portion was requested by the printer (step 760, FIG. 9), performing the steps comprising of:

determining if a partial data portion is requested by the printer (step 770, FIG. 9), retrieving the partial data portion (step 780, FIG. 9), if a partial data portion was requested by the printer, if a partial data portion was not requested by the printer, performing the steps comprising of:

retrieving the specific data portion (step 785, FIG. 9), setting an offset, one of the item in the data for the printer, equal to zero (step 790, FIG. 9).

Whether a partial data portion or an entire data portion is retrieved, the server 10 sends the partial data portion or the entire data portion to the printer 30 along with the identifying data for the document and identifying data for the print data portion, the security indicator of the data and the offset (step 795, FIG. 9). At the server 10, a security indicator is calculated for each of the print data portions. The print data portions can be compressed data or not compressed data. If they are compressed as downloaded, the print data portions must be compressed at the server 10 before sending to the printer 30. Compression schemes used can be lossless such as arithmetic coding, Huffman coding or other forms of entropy coding, or lossy, such as transform coding (DCT, wavelet, for example). Compression schemes used can be standard, such as JPEG, or can be tailored to the application.

If a recoverable error occurs, the server 10 returns an error code to the printer 30 (step 795, FIG. 9).

Detailed Embodiment

One embodiment of this invention, the printer 30 initiates a connection to the server 10 over a TCP/IP network. The connection is initiated via a telephone call. This requires the use of a serial line protocol such as Serial Line IP (SLIP) or Point to Point Protocol (PPP). After the printer makes the telephone call to the server and connects to the server 10, the printer 30 communicates to the server 10 through an API described here. These API calls communicate with the server through a socket interface over TCP/IP. The socket is open throughout a series of API calls during the time that the printer is communicating with the server over the telephone call.

The sequence of operations is as follows:

1) Printer makes a telephone call to the server. The call may be routed through an ISP and then over the Internet. TCP/IP connection is established.
2) Printer makes a socket connection to the server at a specific URL (Uniform Resource Locator).
3) Printer communicates via a series of API calls using the underlying bi-directional socket.
4) Printer closes the socket.
5) Printer disconnects the call.

In this embodiment, the functions comprising the API functions are written in the C programming language, although it should be apparent that other programming languages could be used.

The principal API functions are described below.

API Functions

In the API functions to be described, the first word in the function name is the type of variable returned by the function. A void function does not return a variable. The output of the function is in one of the function arguments, which are typically an input structure and an output structure.

Void OpenSocket

| Printer sets | call returns |
|---|---|
| IP | status |
| Phone (number) | |

This function opens a socket connection to the server at a specific IP address or URL over a designated port. If phone is a non-null argument, the call will dial up the server. If the phone connection has already been made at the time of this call, phone should be set to null.

Void CloseSocket(Int Hangup)

Closes the socket. If hangup is non-zero the telephone connection is terminated.

Note that for these two functions a telephone call and hangup will normally occur, Each of the following API calls gets a pointer to an input structure in which required fields are to be set before making the call and pointer to an output structure in which values are returned. (To avoid any confusion at the server, the structure should be completely zeroed out before setting the required values.) All the API calls must return even if communication with the server is interrupted. In that case, the computer language code implemented with the API call must be able to timeout and set a status code of TIMEOUT_ERROR into the returning server response argument status field.

Some API calls have an additional argument that is a pointer to a buffer. This is either a place to copy in bytes from the server or to copy out bytes to the server. The type of data being transferred is summarized in the following table.

| Description | Direction | Designation |
|---|---|---|
| Compressed bitmap of print | Server to Printer | Print data portion |
| Bitmap of print | Printer to Server | Bitmap |

The implementation of these functions will consist partially of code to read from an open socket or to write to the same socket. All functions operate as follows:

1) size of (input structure) bytes are written into the socket output stream from the input argument structure. The entire structure is written.
2) The functions then read sizeof(output structure) bytes from the socket input stream and copies them into the output argument structure. The function may need to wait until this many bytes are available from the socket. The function must timeout if the data does not become available after a reasonable time interval.
3) The output structure field magic is first examined. If it does not equal MAGIC, then output structure field status must be reset to TRANSMISSION_ERROR and the function should return immediately.
4) For function getNextPrint, additional out.params.print.size bytes are to be read from the socket output stream. It may be necessary to allocate a buffer to hold this data first. (See description of function getNextPrint.) Again, the function must be able to timeout if the data cannot be read after a reasonable time.
5) The function returns and values of the output structure are examined. The specific values to examine depend on the function called. However, status should always be checked.

Void Authenticate

| Printer sets | Server returns |
|---|---|
| magic = MAGIC | magic |
| command = CONNECT | status |
| serialNum | numprints |
| cold | numDownloads |
| modelNum | |
| firmwareNum | |

This function makes the initial call through the socket to the server and authenticate the printer.

For this call, as for others, fields in the returned server response structure that are not specified are to be ignored. Parameter cold is to be set to 1 if the printer was powered down and does not retain any previous image state information. This will cause the server to reset the "in-progress" flags of items to be downloaded to all equal false. In the case where the server has a partial download buffer from the previous connect or has not called the endOfPrint function for the last print, this call should be made with cold set to 0.

There are two possible states at the server:

1) The printer is already registered. In that case the number of prints and the number of downloads needed to fetch these prints are returned. (The number of downloads may be smaller than the number of prints because some downloads may be specified to be printed more than once.)
2) The printer has not been registered. In that case, the server attempts to register the user. A status code is returned indicating that the server was registered or that registration failed. If registration was successful then the returned status is REGISTRATION_SUCCESS. In that case, one or more welcome prints are to be downloaded and printed so that numprints and Downloads will both be returned with value 1.

In case 1) this call may return a status telling the printer to call a function out of the normal sequence. For example, diagnostic commands can be called to return data from the printer to the server or the printer can be directed to make a separate call download new printer parameters.

Void Refresh

| Printer sets | Server returns |
|---|---|
| in.magic = MAGIC | out.magic |
| command = REFRESH | status |
| | numprints |
| | numDownloads |

This call contacts the server and refreshes the still pending number of prints to download. It is possible that new content will have entered the user's server folder while the printer is connected and this call then allows the printer to keep current with the user's folder. The server will query the database each time this call is made.

Void GetNextPrint

| Printer sets | Server returns |
|---|---|
| magic = MAGIC | magic |
| command = GET_NEXT_PRINT | status |
| next.docID | docID |
| next.ID | print.ID |
| last.docID | params.print.numCopies |
| last.ID | params.print.wPixels |
| print.offset | params.print.hPixels |
| | params.print.size |
| | params.print.CRC |
| | params.print.sizeReceived |

This call is made to transfer all or part of the print data portion for the next or indicated print. Arguments next.docID and next.ID can both be set to zero or both to integers specifying the document ID and the print ID of the print data portion to be transferred. If both are zero, the server will transfer the next print data portion in the queue. (Note: Setting either next.ID or next.docID to zero, but not both is not allowed.)

This call supports the case where the printer may have previously downloaded part of a print data portion but then the connection between the printer and the server was broken. If transmission is broken, then the call is to set sizeReceived equal to the actual number of bytes read from the socket and out.status is to be reset to PARTIAL_DATA_SENT. If transmission is successful, the call is to set sizeReceived to equal print.size received from the server. If transmission is broken and the printer is not powered down, the printer knows the ID of the document and print and how much of the print data portion was transferred. The printer then makes this call by setting next.docID and next.ID to be the ID's of the interrupted print and an offset into the print data portion where the printer wants to resume the transfer. After a call to getNextPrint where not all print data portion bytes were received, the new print.offset for a subsequent call to getNextPrint should be the previous print.offset plus the returned value of sizeReceived.

Parameters last.docID and last.ID refer to the last print that was successfully transferred fully to the printer and that the printer still has the bitmap in memory. (Note: If the printer was powered down, this information will have been lost and both of these parameters must be set to zero.) If last.docID and Last.ID parameter are non-zero, the server determines if the print data portion to be downloaded represents the print right after print with ID equal to Last.ID within the same document specified by last.docID.

If offset is zero, then the call will allocate a buffer of size large enough to hold the print data and set buffer to point to this pointer. This will be the case if transmission of a picture is just beginning. If transmission had been interrupted and the printer wants to continue at some point in the byte stream, print.offset should be set to that offset and a pointer passed in pointing to the previously allocated buffer which will be of sufficient size to continue the download to the end of the print data portion.

CRC contains a CRC of the print data portion being transferred that was computed at the server. This CRC is of the portion of the print data portion being transmitted during the current call to the server. The printer function must compute a CRC of the received print data portion (consisting of a whole or portion of print data portion from offset to end) and compare to the transmitted CRC. If they differ, status must be reset to TRANSMISSION_ERROR and the function should return immediately.

Void Ping

| Printer sets | Server returns |
|---|---|
| magic = MAGIC | Nothing |
| command = PING | |

This is an optional call that is used to improve the reliability of data transfer over slow connections. During the time that the printer is receiving a data portion from its input socket, the server has already written the entire data portion into its output socket and is waiting for another command from the printer. If the wait time exceeds a timeout period, the server must assume that there is a problem with the printer/server connection. In this case, the server closes the socket. To prevent this event from occurring in cases where the connection is slow, the printer can send a series of ping commands to the server. Each ping command received causes the server to reset a time variable to the current time. This variable is compared periodically to see if the timeout interval between commands from the printer has been exceeded. Hence, by sending ping commands, the printer informs the server that the connection is still open and functioning and that the server should not close the socket. This is shown in FIG. 9 for printer actions and FIG. 12 for server actions.

Void EndOfPrint

| Printer sets | Server returns |
|---|---|
| magic = MAGIC | magic |
| command = END_OF_PRINT | status |
| params.endPrint.status | |
| params.endPrint.docID | |
| params.endPrint.ID | |

This call is to be made after each print comes out of the printer. If the same print is directed to be printed multiple times, then this call is to be made multiple times, once for each physical print made. The server will update the database each time this call is made. The call to the server is timed to coincide with the actual physical printing so that the user cannot break the connection to the server after receiving the print but before endOfPrint is called and, henceforth, have the same content printed again.

Use of the API Functions

Printer Behavior

An embodiment of a sequence of API calls to be made by the printer and printer behavior, as a function of the values returned by making these calls, is shown in the following series of Figures.

For means of illustration, the following printer variables will be defined:

| Variable | Description |
| --- | --- |
| lastDocID | The index of the last document to be successfully downloaded to the printer |
| lastID | The index of the last print of the last document to be successfully downloaded to the printer |
| nextDocID | The index of the next document that the printer is asking the server to download or zero if the printer is just asking for the next document in the server queue |
| nextID | The index of the next print of the next document or zero |
| offset | Current offset into a download buffer |
| CRC | The CRC of an entire print data portion, when sending an entire print data portion, as computed on the server and returned by a call to getNextPrint when in.params.print.offset is set to zero (or the CRC of a partial print data portion, when sending a partial, print data portion). |
| EndPrintFailure | A flag to indicate that the last call to endOfPrint returned a failed status. |
| Cold | A flag used to set in.connect.cold when calling authenticate |
| Status | The status returned by any call through the API |
| Prints | The number of hard-copy prints, as communicated from the server to the printer |
| Downloads | The number of complete data segments pending to be downloaded from the server to the printer |
| Copies | The number of copies to be made of a print |

These variables are used to hold state during the time the printer is powered up. When the printer is powered down variables must be reset as follows:
LastDocID=0
LastID=0
nextDocID=0
nextID=0
offset=0
CRC=0
endPrintFailure=false
cold=1

The variables are to maintain their current values when the printer is both connected and disconnected from the server, as long as the printer is not powered down.

Figure 10:
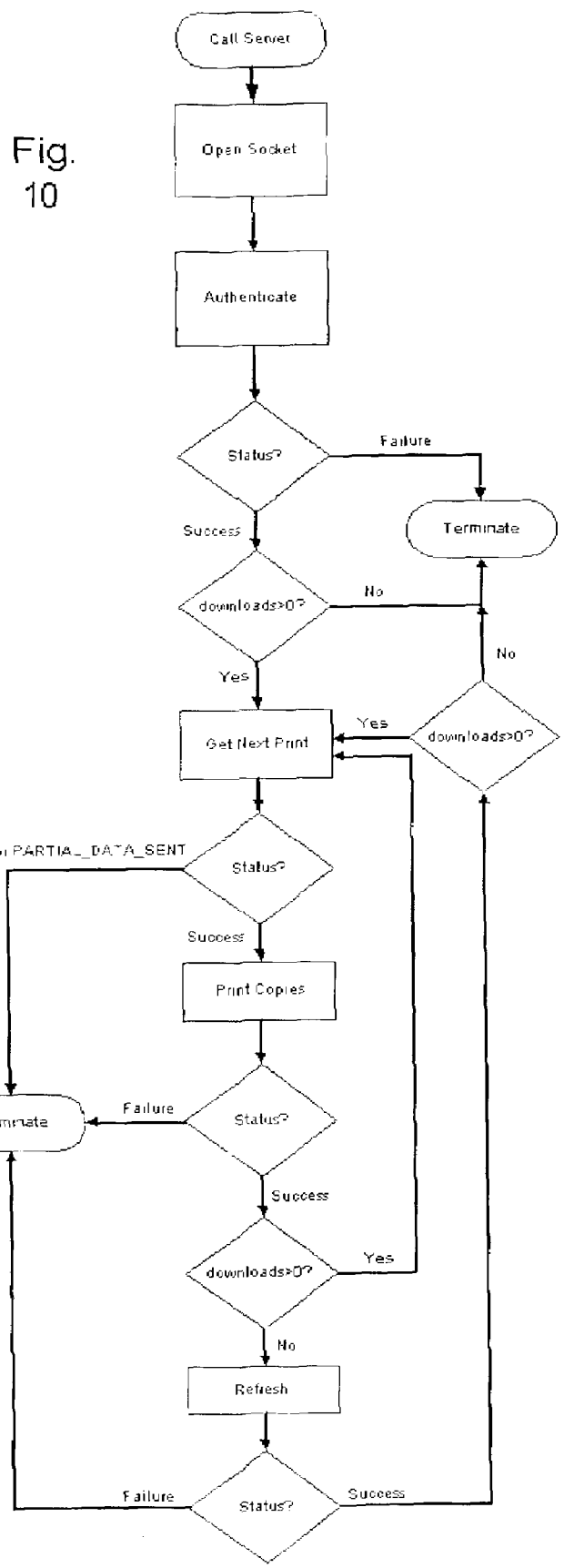
FIG. 10 depicts a flowchart of an embodiment of a sequence of API function calls to be made by the printer.

The diagram showing the overall flow of the printer is shown in FIG. 10.

Figure 11:
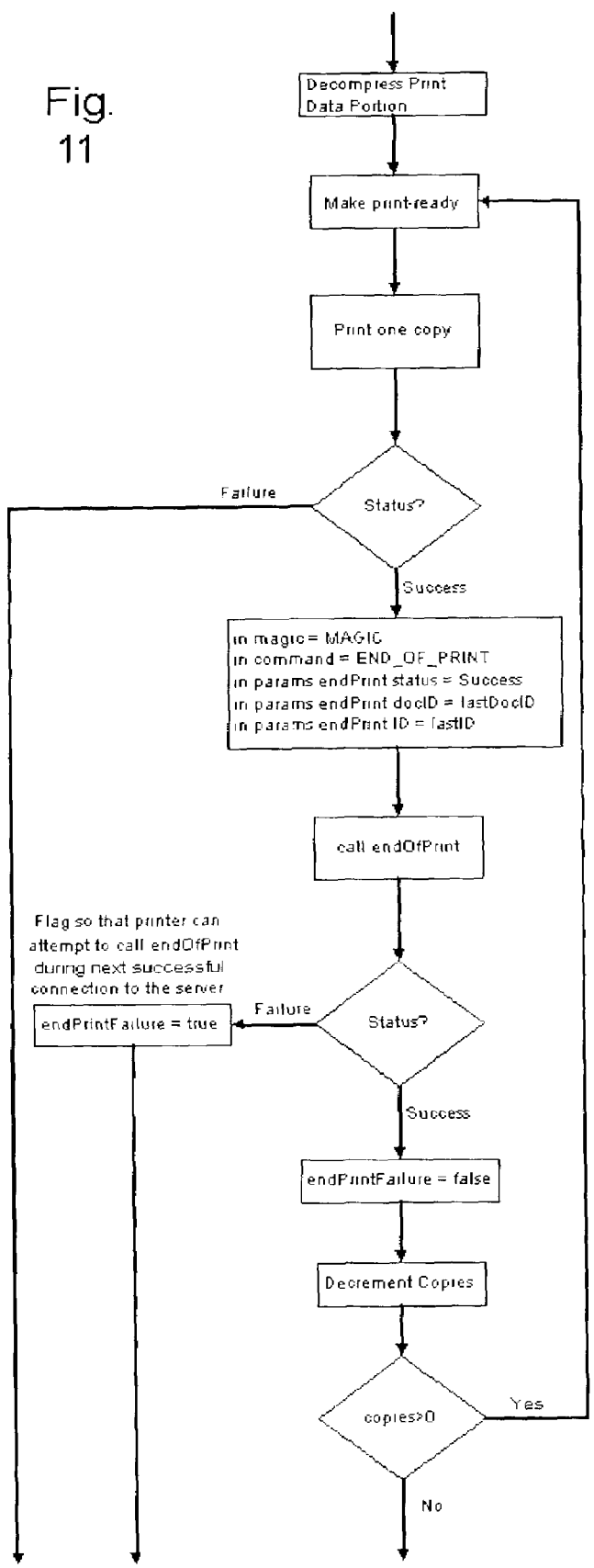
FIG. 11 depicts a flowchart of an embodiment of printer logic during the printing of one or more copies of a print data portion.

FIG. 10 does not show all details of the printer/server communications control flow. Various sub-elements of control can be understood by reference to FIGS. 3, 4 and FIG. 11. These sub-elements refer to the corresponding procedure blocks in FIG. 10. The procedure blocks for refresh and terminate call the refresh and endOfSession functions. FIG. 11 shows printer logic during the printing of one or more copies of a print data portion.

Server Behavior

Figure 12:
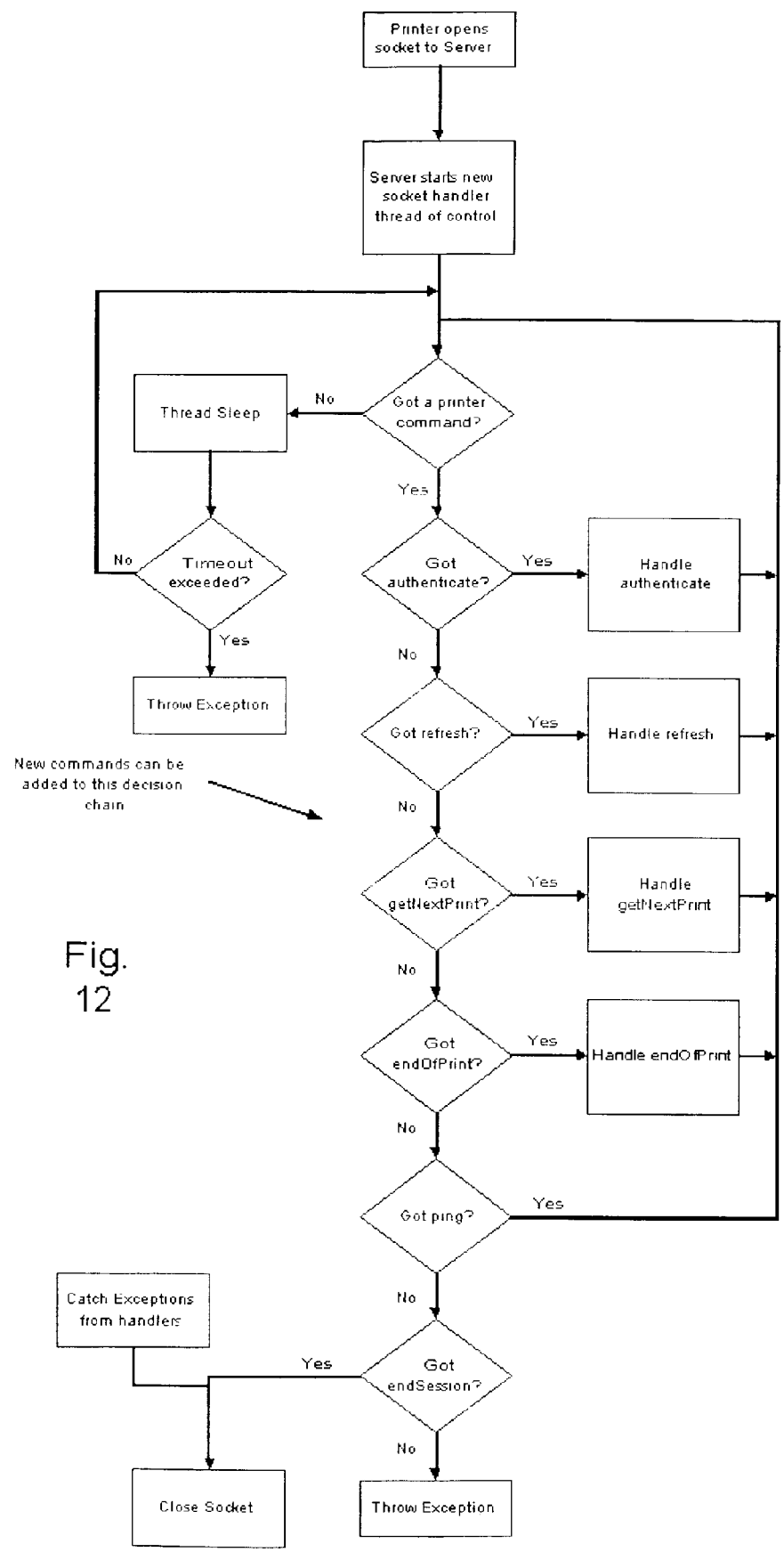
FIG. 12 depicts a flowchart of an embodiment of a sequence of responses at the server to printer function calls.

To complete the description of the printer/server interface, an embodiment of the behavior of the server when responding to API commands sent by the printer has to be described. FIG. 12 shows an embodiment of the server main control loop. This loop is replicated for each printer that connects to the server in a separate thread of control. FIG. 12 is best understood by reference to FIGS. 8 and 9.

Structures

In one embodiment, the first two structures are used to send/receive commands and parameters for many of the interactions between the printer and server through the socket connection. These structures are defined so that they will be a fixed, known length for all commands. This will allow the printer and server to read/write the structures as a single block of bytes of known size. It is assumed that sizeof (int) is 4 bytes integers have been used throughout. This is important since, in this embodiment,the server is implemented in the Java programming language and the Java code needs to read and write these data blocks correctly. Note that both structures begin with a fixed magic number that is known to both the printer and the server.

The following structure is used by the printer when sending commands to the server.

```
struct prnCmd {
    int magic; // Prefix for transfer check. Must be 0x4C535054
("LSPT")
    int command;
    // All commands with parameters have their own struct
    // within union params so that prnCmd is always the same size
    union {
        struct {
            int serialNum; // of printer
            int cold;      // Flag
            unsigned char modelNum[8];     // 0-term C String
            unsigned char firmwareVer[12];// 0-term C String
        } connect;
        struct {
            struct {
                int docID; // of doc of requested print
                int ID; // of requested print
            } next;
            struct {
                int docID;   // of last doc
                int ID; // of last print
            } last;
            int offset;    // Requested offset into capsule
        } print;
        struct {
            int status;   // Printing status
            int docID;    // of doc of print printed
            int ID;    // of print printed
        } endPrint;
    } params;
}
```

The following structure is used by the server to return status to the printer.

```
struct svrRsp {
    int magic;   // Prefix for xfr check. Must be 0x4C535054 ("LSPT")
    int status;
    // All commands with parameters have their own struct
    // within union params so that svrRsp is always the same size
    union {
        struct {
            int numPrints;      // Num prints pending
            int numDownloads;   // Num of downloads required to get prints
        } connect; // Used by both connect and refresh command
        struct {
            int docID;          // Document ID of the print
            int ID;             // ID of the print
            int numCopies;      // Number of copies of the print
            int wPixels;        // Pixels across width of the paper
            int hPixels;        // Pixels along length of the paper
            int size;           // Size of portion of capsule sent
            int CRC;            // A crc of portion of capsule sent
            int sizeReceived;   // Actual size of capsule received
        } print;
        unsigned char phoneNumber[12]; // Phone number digits
    } params;
};
```

Security Enhancements

The following are two methods for enhancing the security and reliability of communications between the printer and the server.

1) Immediately after the socket connection is made, the server will send a challenge phrase to the printer. This can consist of either a single integer value or a buffer of byte data of fixed size. The data will be randomly generated on the server. The printer will run an algorithm over the data to produce a hash value that will be returned to the server. The server will run the same algorithm over the original data sent and compare the results. If they match, the connection is allowed to proceed. If they do not, the server will immediately close the socket. A simple hash algorithm that takes advantage of code already present on the server is to simply run the CRC algorithm over the challenge data and return the CRC value to the server.

2) Right before endOfSession is called a new API call will be made. In this call, the printer will send some dynamic data to the server. This could be a randomly generated number or some data describing the operation of the server during the current session. The server receives this data and stores it into the database. If successful, a code of SUCCESS is returned to the printer. The printer then stores the same data in persistent memory. When the printer next connects to the server, the printer sends the same data. The server checks against what was saved in the database. If they agree, the connection is allowed to continue. If they disagree, then the server will send a second challenge phrase that is hashed by the printer using a different algorithm. The result is sent back to the server where it is checked by running the corresponding algorithm similar to 1) above. Since this situation will rarely occur, it makes it much less likely that a hostile process "listening" to the Internet data transfer would be able to gather enough data to reverse engineer the second hashing algorithm.

In addition to these application-level security measures, there are measures that are provided by the software products that the printer and server are implemented with. The server can prevent denial of service attacks by setting a parameter that limits the size of a data block received at the server to a known, maximum size. Secondly, the printer will initially connect with a user name and password that is implemented below the application level software described herein. Third, serial line protocols used over modems such as PPP implement a Challenge Handshake protocol (CHAP), which is used to verify the identity of a client using a 3-way handshake scheme.

Printer and Server Implementations

The methods of this invention can be implemented by a printer system and a server system comprising means for implementing the functions described above. At least one processor and supporting memory at the printer and, similarly, at least one processor and supporting memory at the server can be used to implement the methods of this invention. Processors can be dedicated processors, or general purpose processors and supporting memory could be any computer accessible memory.

One additional advantage of the present invention is the reduction of loading of the memory at the server. For servers operating under TCP, when a connection closes, in order to block further connections, TIME_WAIT states are kept in the server memory (T. Faber, J. Touch, W. Yue, "The TIME-WAIT state in TCP and Its Effect on Busy Servers", http://www.isi.edu/touch/pubs/infocomm99/infocomm99-web/). The present method reduces the memory loading by:
a) sending an endOfSession message to the server at the end of the printing session causing the server to close the socket at the server without responding to the printer, and,
b) closing the socket at the printer after sending the endOfSession message. This action eliminates the need for a server to maintain a TIME_WAIT state for each recently disconnected printer. This reduces server memory requirements and increases processing speed.

The complete two way communication between the printer and the server, which is described above, enables the remote operation of the printer (without a companion computer). The protocol disclosed above enables complete two-way communication between output devices and servers and ensures reliable communication by allowing the transmission of information to restart at the point of interruption, if interrupted.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Although the above description refers to a specific embodiment, it should be apparent that other embodiments are within the scope of the invention. For example, rather than sending a notification to the server after every print, such notification could be sent after a number of prints. Other similar modifications are within the scope of the art.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-accessible storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read and/or write.

Elements and components described herein may be further divided into additional components or joined together to form fewer components for performing the same functions.

Although the invention has been described with respect to various embodiments, it should be realized this invention is also capable of a wide variety of further and other embodiments within the spirit and scope of the appended claims.

What is claimed is:

1. A method for enabling a mobile printer to download data items from a server, said data items comprising print data portions to be printed, said method comprising the steps of:
   establishing an interprocess communication mechanism comprising a connection end point and a network address, said network address identifying a server in a network;
   communicating with said server, said communication comprising: sending a request for authentication to the server from the mobile printer;
   receiving from the server an authentication response;
   requesting from the server print data portions to be downloaded, if the authentication is successful;
   attempting to receive from the server print data portions to be printed or viewed, wherein said attempting step comprises:
      receiving from the server a security indicator for the specific print data portion, said security indicator being calculated from said print data portion;
      calculating at the printer a printer calculated security indicator for the specific print data portion;
      comparing the printer calculated security indicator with the security indicator provided by the server; and
      generating, if the comparison of security indicators yields a difference, a status indicating a transmission failure for the specific print data portion;
   repeating the attempting step if the attempting step fails to receive all of the print data portions;
   notifying the server after print completion; and, terminating the communications connection when a printing session ends or if an error occurs.

2. The method of claim 1 wherein the step of receiving from the server an authentication response further comprises the step of:
   receiving from the server status information, a specified number for the data items to be printed, and, a specified number for the print data portions to be downloaded.

3. The method of claim 2 wherein the steps of requesting from the server print data portions and attempting to receive from the server said print data portions further comprise the steps of:

a) sending a request to the server for one print data portion, upon receiving the specified number of data items to be printed and a specified number of copies to be printed of each of said specified number of data items;
b) receiving a response from the server including said one print data portion and a status for the data portion request;
c) optionally sending one or more ping commands to the server to inform the server to keep the communications connection open;
d) terminating the communications connection if the printer determines there was a transmission failure;
e) printing said one print data portion, if the printer determines there was a transmission success;
f) sending a notification of print completion to the server upon completion of printing; and
terminating the communications connection if print completion was not successful.

4. The method of claim 3 further comprising the step of:
   repeating steps d) through f) until the specified number of copies to be printed of said one print data portion are printed, if print completion was successful.

5. The method of claim 3 further comprising the step of:
   g) repeating steps d) through f) until the specified number of copies to be printed of said one print data portion is printed, if print completion was successful; and
   h) repeating steps a) through g) until the specified number of print data portions to be down loaded has been downloaded.

6. The method of claim 3 wherein said one print data portion comprises compressed data.

7. The method of claim 6 further comprising the step of: uncompressing said print data portions.

8. The method of claim 1 wherein the step of communicating with said server further comprising the step of:
   obtaining from the server an updated specified number of data items to be printed and an updated specified number of print data portions to be downloaded.

9. The method of claim 1 wherein the step of receiving from the server an authentication response further comprises the steps of:
   sending to the server data identifying the characteristics of the mobile printer;
   receiving from the server an authentication response, status information, a specified number for the data items to be printed, and a specified number for the print data portions to be downloaded;
   examining the status;
   terminating the connection if the printer determines there was a failure;
   determining if previous communication failed to successfully notify print completion to the server, if status indicates a success;
   if previous communication connection failed to successfully notify print completion to the server, performing the step of:
      sending a notification of print completion to the server.

10. The method of claim 1 further comprising the steps of:
    determining identifying data for at least two documents;
    identifying data for the print data portion in one of said at least two documents and identifying data for an offset in said print data portion, said at least two documents comprising a next document to be printed and a last document printed and said print data portion corresponding to the next document to be printed;
    receiving from the server a status;

terminating the communications connection if the printer determines there was a transmission failure; and if the status from a previous communication indicates a partial data sent status, performing the steps comprising of:
- receiving from the server a specific print data portion having a given size; and
- increasing the offset by the given size of the specific print data portion.

11. The method of claim 10 further comprising the step of: receiving from the server identifying data for a document and identifying data for the print data portions in the document.

12. The method of claim 1 further comprising the steps of:
receiving from the server a security indicator for each of said print data portions, each of said security indicators being calculated from each of said print data portions;
calculating at the printer a printer calculated security indicator for each of said print data portions;
comparing, for each print data portion, the printer calculated security indicator with the security indicator provided by the server; and
generating, if the comparison of security indicators yields a difference, a status indicating a transmission failure for the corresponding print data portion.

13. The method of claim 12 wherein the security indicator is a cyclic redundancy code.

14. The method of claim 1 wherein the print data portions comprise compressed data.

15. The method of claim 14 further comprising the step of: uncompressing said print data portions.

16. A method for enabling a server to provide data items to a mobile printer said data items comprising print data portions to be printed, said method comprising the steps of:
establishing a process to control communications through a communication connection endpoint to another communication connection endpoint, upon said another communication connection endpoint being established;
communicating with said mobile printer, said communication comprising:
- sending an authentication response, upon receipt of an authentication request from the mobile printer;
- sending print data portions to be printed, upon receipt of a request from the mobile printer for print data portions to be downloaded; and,
- optionally sending one or more ping commands to the server to inform the server to keep the communications connection open; and,
- attempting to receive from the mobile printer notification after completion of printing;
- repeating said attempting step if the attempting step fails to receive the notification;
- sending status information in response to receipt of notification after printing; and,
terminating the communications connection when a printing session ends or if an error occurs;
wherein said step of sending to the mobile printer an authentication response further comprises the steps of
receiving from the mobile printer data identifying characteristics of the mobile printer; comparing the characteristics of the mobile printer to data in a database;
determining if the characteristics of the mobile printer are found in the database;
sending to the mobile printer a specified number for the data items to be printed, and a specified number for the print data portions to be downloaded, if the characteristics of the mobile printer are found in the database; and if the characteristics of the mobile printer are not found in the database, performing a registration process comprising the steps of:
- registering the characteristics of the mobile printer in the database,
- determining if the registration was successful;
- sending to the mobile printer a specified number for the data items to be printed, and a specified number for the print data portions to be downloaded, if the registration was successful; and
- sending to the mobile printer an error status, if the registration was not successful.

17. The method of claim 16 wherein the step of sending an authentication response further comprises the step of:
sending to the mobile printer status information, a specified number for the data items to be printed, and a specified number for the print data portions to be downloaded.

18. The method of claim 16 wherein the step of communicating with said mobile printer further comprising the step of:
sending to the mobile printer an updated specified number of data items to be printed and an updated specified number of print data portions to be downloaded.

19. The method of claim 16 wherein the step of sending print data portions to be printed further comprises the steps of:
obtaining identifying data for a next document to be printed, identifying data for a next print data portion to be printed, identifying data for a last document which was printed, and identifying data for a last print data portion which was printed;
determining if a request for print data portions is immediately subsequent to a mobile printer registration;
sending to the mobile printer at least one welcome print data portion, if a request for print data portions is immediately subsequent to a mobile printer registration;
sending to the mobile printer at least one welcome print data portion, if the next document to be printed is a welcome print document;
determining if a specific data portion is requested by the mobile printer;
sending a next data portion in a print queue, if a specific data portion was not requested by the mobile printer,
if a specific data portion was requested by the mobile printer, performing the steps comprising of:
determining if a partial data portion is requested by the mobile printer;
sending the partial data portion, if a partial data portion was requested by the mobile printer;
if a partial data portion was not requested by the mobile printer, performing the steps comprising:
sending the specific data portion; and
sending to the mobile printer data for an offset, said offset being set to zero.

20. The method of claim 19 further comprising the step of:
calculating a security indicator for each said print data portion; and
sending each of said security indicators calculated from each said print data portions to the mobile printer.

21. The method of claim 20 wherein the security indicator is a cyclic redundancy code.

22. The method of claim 16 wherein the step of communicating with said mobile printer further comprises the steps of:

calculating a security indicator for each of said print data portions; and sending each of said security indicators calculated for each of said print data portions to the mobile printer.

23. The method of claim 22 wherein the security indicator is a cyclic redundancy code.

24. The method of claim 16 further comprising the step of: compressing said print data portions.

25. A printer comprising:

a processor;

at least one computer-accessible memory, said at least one computer-accessible memory having computer instructions embodied therein, said instructions comprising:

means for establishing an interprocess communication mechanism comprising a connection end point and a network address, said network address identifying a server in a network and an entry point into an application at said server;

means for communicating with said server, said communication comprising:

sending a request for authentication to the server from the mobile printer;

receiving from the server an authentication response;

requesting from the server print data portions to be downloaded, if the authentication is successful;

attempting to receive from the server print data portions to be printed;

repeating the attempting step if the attempting step fails to receive all of the print data portions;

optionally sending one or more ping commands to the server to inform the server to keep the communications connection open;

receiving from the server status information, a specified number for the data items to be printed, and a specified number for the print data portions to be downloaded;

and notifying the server after print completion; and, terminating the communications connection when a printing session ends or if an error occurs;

means for sending a request to the server for one print data portion, upon receiving the specified number of data items to be printed and a specified number of copies to be printed of each of said specified number of data items;

means for receiving a response from the server including said one print data portion and a status for in the data portion request;

means to optionally sending one or more ping commands to the server to inform the server to keep the communications connection open;

means for terminating the communications connection if the printer determines there was a transmission failure;

means for printing said one print data portion and sending a notification of print completion to the server upon completion of printing, if the printer determines there was transmission success;

means for terminating the communications connection if print completion was not successful;

means for repeatedly applying means d) and e) until the specified number of copies to be printed of said one print data portion is printed, if print completion was successful; and means for repeatedly applying means a through f until the specified number of print data portions to be down loaded has been downloaded.

26. The printer of claim 25 wherein the computer instructions embodied in the at least one computer-accessible memory further comprise: means for obtaining from the server an updated specified number of data items to be printed and an updated specified number of print data portions to be downloaded.

27. The printer of claim 25 wherein the computer instructions embodied in the at least one computer readable memory further comprise:

means for sending to the server data identifying the characteristics of the mobile printer;

means for examining the status upon receiving from the server an authentication response, status information, a specified number for the data items to be printed, and, a specified number for the print data portions to be downloaded;

means for terminating the connection if status indicates a failure;

means for determining if previous communication connection failed to successfully notify print completion to the server, if status indicates a success; if previous communication connection failed to successfully notify print completion to the server, providing means for:

sending a notification of print completion to the server.

28. The printer of claim 25 wherein the computer instructions embodied in the at least one computer-accessible memory further comprise:

means for determining identifying data for at least two documents, identifying data for the print data portion in one of said at least two documents and identifying data for an offset in said print data portion, said at least two documents comprising a next document to be printed and a last document printed and said print data portion corresponding to the next document to be printed;

means for receiving from the server a status;

means for terminating the communications connection if the printer determines there was a transmission failure;

if a saved status from a previous communication indicates a partial data sent status, providing means for:

receiving from the server a specific print data portion having a given size; and increasing the offset by the given size of the specific print data portion.

29. The printer of claim 25 wherein the computer instructions embodied in the at least one computer readable memory further comprise:

means for receiving from the server a security indicator for each of said print data portions, each of said security indicators being calculated from each of said print data portions;

means for calculating at the printer a printer calculated security indicator for each of said print data portions;

means for comparing, for each print data portion, the printer calculated security indicator with the security indicator provided by the server; and means for generating, if the comparison of security indicators yields a difference, a status indicating a transmission failure for the corresponding print data portion.

30. The printer of claim 29 wherein the security indicator is a cyclic redundancy code.

31. The printer of claim 25 wherein said print data portions comprise compressed data and the computer instructions embodied in the at least one computer readable memory further comprise:

means for uncompressing said print data portions.

32. A server providing data items to a mobile printer, said server comprising:

a processor; at least one computer-accessible memory, said at least one computer-accessible memory having computer instructions embodied therein, said instructions comprising:

means for establishing a process to control communications through a communication connection endpoint to another communication connection endpoint, upon said another communication connection endpoint being established;

means to measure the time since the last command from said mobile printer was received and to terminate the communications connection if this time exceeds a timeout constant;

means for communicating with said mobile printer, said communication means comprising:

means for sending an authentication response upon receipt of an authentication request from the mobile printer;

means for attempting to send print data portions to be printed, upon receipt of a request from the mobile printer for print data portions to be downloaded;

means for repeating the attempting step if the attempting step fails to send all the print data portions;

means for receiving from the mobile printer notification after print completion;

means for sending status information in response to receipt of notification after printing;

means for terminating the communications connection when a printing session ends or if the time between commands received from the printer exceeds a constant timeout period or if an error occurs.

means for receiving from the mobile printer data identifying characteristics of the mobile printer;

means for comparing the characteristics of the mobile printer to data in a database;

means for determining if the characteristics of the mobile printer are found in the database;

means for sending to the mobile printer a specified number for the data items to be printed, and, a specified number for the print data portions to be downloaded, if the characteristics of the mobile printer are found in the database;

means for performing if the characteristics of the mobile printer are not found in the database, a registration process comprising the steps of:

means for registering the characteristics of the mobile printer in the database, means for determining if the registration was successful;

means for sending to the mobile printer a specified number for the data items to be printed, and, a specified number for the print data portions to be downloaded, if the registration was successful; and means for sending to the mobile printer an error status, if the registration was not successful.

33. The server of claim 32 wherein the computer instructions embodied in the at least one computer-accessible memory status information, a specified number for the data items to be printed, and, a specified number for the print data portions to be downloaded, upon receipt of an authentication request from the mobile printer.

34. The server of claim 32 wherein the computer instructions embodied in the at least one computer accessible memory further comprise:

means for sending to the mobile printer an updated specified number of data items to be printed and an updated specified number of print data portions to be downloaded.

35. The server of claim 32 wherein the computer instructions embodied in the at least one computer-accessible memory further comprise:

means for obtaining identifying data for a next document to be printed, identifying data for a next print data portion to be printed, identifying data for a last document which was printed, and identifying data for a last print data portion which was printed;

means for determining if a request for print data portions is immediately subsequent to a mobile printer registration;

means for sending to the mobile printer at least one welcome print data portion, if a request for print data portions is immediately subsequent to a mobile printer registration;

means for sending to the mobile printer at least one welcome print data portion, if the next document to be printed is a welcome print document;

means for determining if a specific data portion is requested by the mobile printer;

means for sending a next data portion in a print queue, if a specific data portion was not requested by the mobile printer, if a specific data portion was requested by the mobile printer, providing means for performing the steps comprising:

determining if a partial data portion is requested by the mobile printer;

sending the partial data portion, if a partial data portion was requested by the mobile printer;

if a partial data portion was not requested by the mobile printer, providing means for performing the steps comprising of:

sending the specific data portion; sending to the mobile printer data for an offset, said offset being set to zero.

36. The server of claim 32 wherein the computer instructions embodied in the at least one computer-accessible memory further comprise:

means for calculating a security indicator for each of said print data portions; and, means for sending each of said security indicators calculated for each of said print data portions to the mobile printer.

37. The server of claim 36 wherein the security indicator is a cyclic redundancy code.

38. The server of claim 32 wherein the computer instructions embodied in the at least one computer readable memory further comprise:

means for compressing said print data portions.

39. A computer program product comprising:

a computer readable medium having computer readable code stored therein for enabling a mobile printer to download data items from a server, said data items comprising print data portions to be printed, said code causing a computer system to:

establish an interprocess communication mechanism comprising a connection end point and a network address, said network address identifying a server in a network;

communicate with said server, said communication comprising:
  sending a request for authentication to the server from the mobile printer;
  receiving from the server an authentication response;
  requesting from the server print data portions to be downloaded, if the authentication is successful;
  attempting to receive from the server print data portions to be printed;
receive from the server a security indicator for each of said print data portions, each of said security indicators being calculated from each of said print data portions;
calculate at the printer a printer calculated security indicator for each of said print data portions;
compare, for each print data portion, the printer calculated security indicator with the security indicator provided by the server; and
generate, if the comparison of security indicators yields a difference, a status indicating a transmission failure for the corresponding print data portion;
repeating the attempting step if the attempting step fails to receive all the print data portions; and
notifying the server after print completion; and, terminate the interprocess communication mechanism when a printing session ends or if an error occurs.

40. The computer program product of claim 39 wherein the computer-readable code that causes the computer system to communicate with the server, said communication further comprises receiving from the server status information, a specified number for the data items to be printed, and, a specified number for the print data portions to be downloaded.

41. The computer program product of claim 39 wherein the computer-readable code further causes a computer system to:
  a) send a request to the server for one print data portion, upon receiving the specified number of data items to be printed and a specified number of copies to be printed of each of said specified number of data items;
  b) receive a response from the server including said one print data portion and a status for the data portion request;
  c) terminate the communications connection if the sprinter determines there was a transmission failure;
  d) print said one print data portion, if the printer determines there was a transmission success;
  e) send a notification of print completion to the server upon completion of printing; and
  f) terminate the communications connection if print completion was not successful.

42. The computer program product of claim 41 wherein the computer-readable code further causes a computer system to:
  repeat operations d) through f) until the specified number of copies to be printed of said one print data portion is printed, if print completion was successful.

43. The computer program product of claim 42 wherein the computer-readable code further causes a computer system to:
  g) repeat operations d) through f) until the specified number of copies to be printed of said one print data portion is printed, if print completion was successful; and
  h) repeat operations a) through g) until the specified number of print data portions to be down loaded has been downloaded.

44. The computer program product of claim 39 wherein the computer-readable code further causes a computer system to:
  obtain from the server an updated specified number of data items to be printed and an updated specified number of print data portions to be downloaded.

45. The computer program product of claim 39 wherein the computer-readable code further causes a computer system to:
  send to the server data identifying the characteristics of the mobile printer;
  receive from the server an authentication response, status information, a specified number for the data items to be printed, and, a specified number for the print data portions to be downloaded;
  examine the status;
  terminate the connection if the printer determines there was a failure;
  determine if previous communication connection failed to successfully notify print completion to the serve, if status indicates a success;
  if previous communication connection failed to successfully notify print completion to the serve, perform the step of:
  sending a notification of print completion to the server.

46. The computer program product of claim 39 wherein the computer-readable code further causes a computer system to:
  determine identifying data for at least two documents, identifying data for the print data portion in one of said at least two documents and identifying data for an offset in said print data portion, said at least two documents comprising a next document to be printed and a last document printed and said print data portion corresponding to the next document to be printed;
  receive from the server a status;
  terminate the communications connection if the printer determines there was a failure; and
  if a saved status from a previous communication indicates a partial data sent status, perform the steps comprising of:
  receiving from the server a specific print data portion having a given size; and
  increasing the offset by the given size of the specific print data portion.

47. The computer program product of claim 46 wherein the computer-readable code further causes a computer system to:
  receive from the server identifying data for a document and identifying data for the print data portions in the document.

48. The computer program product of claim 39 wherein the print data portions comprise compressed data and the computer-accessible code further causes a computer system to:
  uncompress said print data portions.

49. A computer program product comprising:
  a computer-readable medium having computer-readable code embodied therein for enabling a server to provide data items to a mobile printer said that items comprising print that portions to be printed, said code causing a computer system to:
  establish a process to control communications through a communication connection endpoint to another communication connection endpoint, upon said another communication connection endpoint being established;

communicate with said mobile printer, said communication comprising:
  sending an authentication response;
  attempting to send print data portions to be printed, upon receipt of a request from the mobile printer for print data portions to be downloaded;
  repeating the attempting step if the attempting step fails to send all of the print data portions;
  receiving from the mobile printer notification after print completion;
sending status information in response to receipt of notification after printing;
receive from the mobile printer data identifying characteristics of the mobile printer;
compare the characteristics of the mobile printer to data in a database;
determine if the characteristics of the mobile printer are found in the database;
send to the mobile printer a specified number for the data items to be printed, and, a specified number for the print data portions to be downloaded, if the characteristics of the mobile printer are found in the database;
if the characteristics of the mobile printer are not found in the database, perform a registration process comprising the steps of:
  registering the characteristics of the mobile printer in the database,
  determining if the registration was successful;
  sending to the mobile printer a specified number for the data items to be printed, and a specified number for the print data portions to be downloaded, if the registration was successful; and
  sending to the mobile printer an error status, if the registration was not successful; and,
terminate the communications connection when a printing session ends or if the time between commands received exceed a timeout constant or if an error occurs.

50. The computer program product of claim 49 wherein the computer-readable code that causes a computer system to communicate with said mobile printer, said communication further comprises status information, a specified number for the data items to be printed, and, a specified number for the print data portions to be downloaded, upon receipt of an authentication request from the mobile printer.

51. The computer program product of claim 49 wherein the computer-readable code further causes a computer system to:
  send to the mobile printer an updated specified number of data items to be printed and an updated specified number of print data portions to be downloaded.

52. The computer program product of claim 49 wherein the computer-readable code further causes a computer system to:
  obtain identifying data for a next document to be printed, identifying data for a next print data portion to be printed, identifying data for a last document which was printed, and identifying data for a last print data portion which was printed;
  determine if a request for print data portions is immediately subsequent to a mobile printer registration;
  send to the mobile printer at least one welcome print data portion, if a request for print data portions is immediately subsequent to a mobile printer registration;
  send to the mobile printer at least one welcome print data portion, if the next document to be printed is a welcome print document;
  determine if a specific data portion is requested by the mobile printer;
  send a next data portion in a print queue, if a specific data portion was not requested by the mobile printer;
  if a specific data portion was requested by the mobile printer, perform the steps comprising of:
    determining if a partial data portion is requested by the mobile printer; and
    sending the partial data portion, if a partial data portion was requested by the mobile printer;
  if a partial data portion was not requested by the mobile printer, perform the steps comprising of:
  sending the specific data portion; and
  sending to the mobile printer data for an offset, said offset being set to zero.

53. The computer program product of claim 49 wherein the computer-readable code further causes a computer system to:
  calculate a security indicator for each of said print data portions; and
  send each of said security indicators calculated for each of said print data portions to the mobile printer.

54. The computer program product of claim 49 wherein the computer-readable code further causes a computer system to:
  compress said print data portions.

55. A method of ensuring reliable and secure communications between a server and a remote printer, where the remote printer has finished a printing session, comprising the steps of:
  sending a specific item of data to the server;
  receiving said specific item of data at the server;
  sending to the printer a status code;
  storing the specific item of data in a database at the server, if the status indicates success;
  storing the specific item of data in a persistent memory at the printer, if the status indicates success;
  terminating the session;
  sending, from the remote printer, to the server said specific item of data stored in the persistent memory at the printer, at the beginning of the next printing session;
  comparing, at the server, the received specific item of data stored in the persistent memory at the printer to the specific item of data stored in the database;
  continuing the connection, if the received specific item of data stored in the persistent memory at the printer agrees with the specific item of data stored in the database;
  if the received specific item of data stored in the persistent memory at the printer does not agree with the specific item of data stored in the database, performing the steps of:
  a) sending from the server specified data to the remote printer immediately after the process to control communications has been established;
  b) executing an algorithm, at the remote printer, over the specified data to produce a first hash value;
  c) sending the first hash value to the server;
  d) executing said algorithm, at the server, over the specified data to produce a second hash value;
  e) comparing the second hash value and the first hash value;
  f) allowing the connection to continue, if the second hash value and the first hash value match; and
  g) terminating the connection if the second hash value and the first hash value do not match.

* * * * *